United States Patent
Dvorecki et al.

(10) Patent No.: US 12,510,656 B2
(45) Date of Patent: Dec. 30, 2025

(54) APPARATUS, SYSTEM, AND METHOD OF PROCESSING POINT CLOUD RADAR INFORMATION

(71) Applicant: Intel Corporation, Santa Clara, CA (US)

(72) Inventors: Nir Dvorecki, Herzeliya (IL); Yuval Amizur, Kfar-Saba (IL); Leor Banin, Petach Tikva (IL); Yaniv Frishman, Kiryat Ono (IL)

(73) Assignee: INTEL CORPORATION, Santa Clara, CA (US)

( * ) Notice: Subject to any disclaimer, the term of this patent is extended or adjusted under 35 U.S.C. 154(b) by 792 days.

(21) Appl. No.: 17/559,896

(22) Filed: Dec. 22, 2021

(65) Prior Publication Data
US 2022/0113402 A1  Apr. 14, 2022

(51) Int. Cl.
G01S 13/90 (2006.01)
G01S 7/41 (2006.01)
G01S 13/42 (2006.01)

(52) U.S. Cl.
CPC .......... G01S 13/9027 (2019.05); G01S 7/417 (2013.01); G01S 13/426 (2013.01)

(58) Field of Classification Search
CPC ..... G01S 13/9027; G01S 7/417; G01S 13/426
See application file for complete search history.

(56) References Cited

U.S. PATENT DOCUMENTS 9,221,396 B1 * 12/2015 Zhu .................. G08G 1/163
9,858,640 B1 *  1/2018 Earl ................. G06T 11/60
11,520,037 B2 * 12/2022 Bongio Karrman ................
                                              G05D 1/0088

(Continued)

FOREIGN PATENT DOCUMENTS

KR  10-2021-0001219   1/2021
KR  10-2021-0053239   5/2021
WO     2019/195363  10/2019

OTHER PUBLICATIONS

International Preliminary Report on Patentability for International Application No. PCT/US2022/050574, mailed on Jul. 4, 2024, 6 pages.

(Continued)

*Primary Examiner* — Vladimir Magloire
*Assistant Examiner* — Kimberly Jenkins
(74) *Attorney, Agent, or Firm* — Shichrur & Co.

(57) ABSTRACT

For example, a processor may be configured to process point cloud (PC) radar information comprising radar detection information of a plurality of possible detections, wherein radar detection information corresponding to a possible detection of the plurality of possible detections comprises information of a plurality of radar attributes of the possible detection, wherein the processor is configured to determine a plurality of validity scores corresponding to the plurality of possible detections based on the radar detection information of the plurality of possible detections, a validity score corresponding to the possible radar detection to indicate whether it is more probable that the possible detection is a valid detection or a False-Alarm (FA) detection, wherein the processor is to output radar target information based on the plurality of validity scores corresponding to the plurality of possible detections.

24 Claims, 17 Drawing Sheets

(56) References Cited

U.S. PATENT DOCUMENTS

| | | | |
|---|---|---|---|
| 11,556,745 B2* | 1/2023 | Hennings Yeomans | ..................... G01S 13/89 |
| 12,164,058 B2* | 12/2024 | Chebiyyam | ........... G01S 13/931 |
| 12,263,865 B1* | 4/2025 | Armstrong-Crews | ..................... B60W 60/001 |
| 2018/0348343 A1 | 12/2018 | Achour et al. | |
| 2020/0302237 A1* | 9/2020 | Hennings Yeomans | ..................... G06V 20/56 |
| 2021/0026355 A1* | 1/2021 | Chen | ........ G01S 17/89 |
| 2021/0117659 A1* | 4/2021 | Foroozan | ................ G06V 10/25 |
| 2021/0192841 A1* | 6/2021 | Hu | ........................ G01S 13/867 |
| 2022/0113402 A1 | 4/2022 | Dvorecki et al. | |
| 2022/0214425 A1* | 7/2022 | Yoffe | .................... G01S 13/584 |
| 2023/0044001 A1* | 2/2023 | Abouelela | ............ G06V 10/443 |

OTHER PUBLICATIONS

International Search Report and the Written Opinion for International Application No. PCT/US2022/050574, mailed on Apr. 3, 2023, 10 pages.

Search Report for European Patent Application No. 22912237.9, mailed on Oct. 21, 2025, 15 pages.

\* cited by examiner

APPARATUS, SYSTEM, AND METHOD OF PROCESSING POINT CLOUD RADAR INFORMATION

TECHNICAL FIELD

Aspects described herein generally relate to processing point cloud radar information.

BACKGROUND

Various types of devices and systems, for example, assistance or autonomous systems, e.g., used in vehicles, airplanes and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
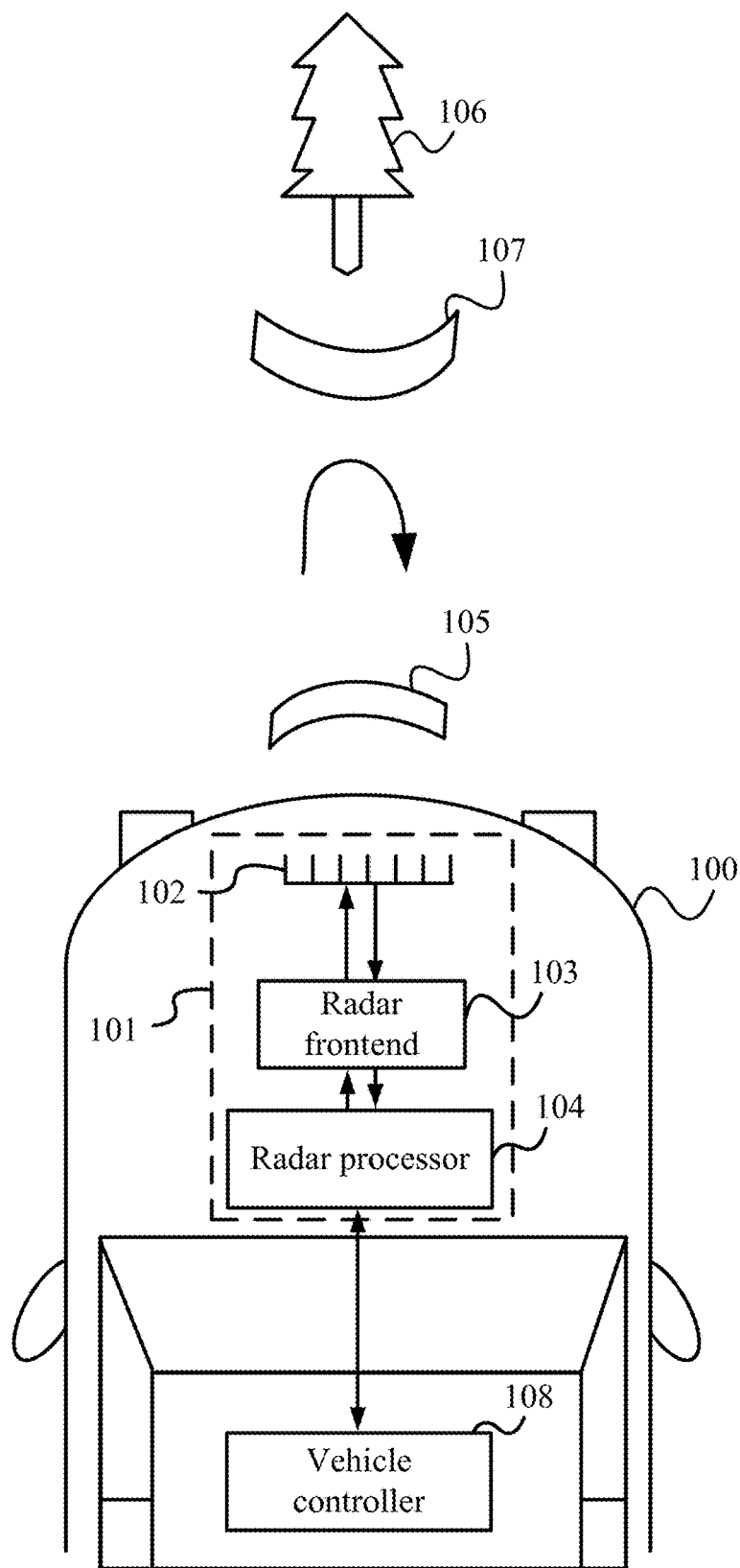
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: *Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation). In addition, systems described herein may be used for assistance purposes in vehicles, e.g., to provide information to a driver and/or other occupants of a vehicle.

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar devices 101. For example, radar device 101 may be implemented by a plurality of radar units, which may be at a plurality of locations, e.g., around vehicle 100. In other aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehiclular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
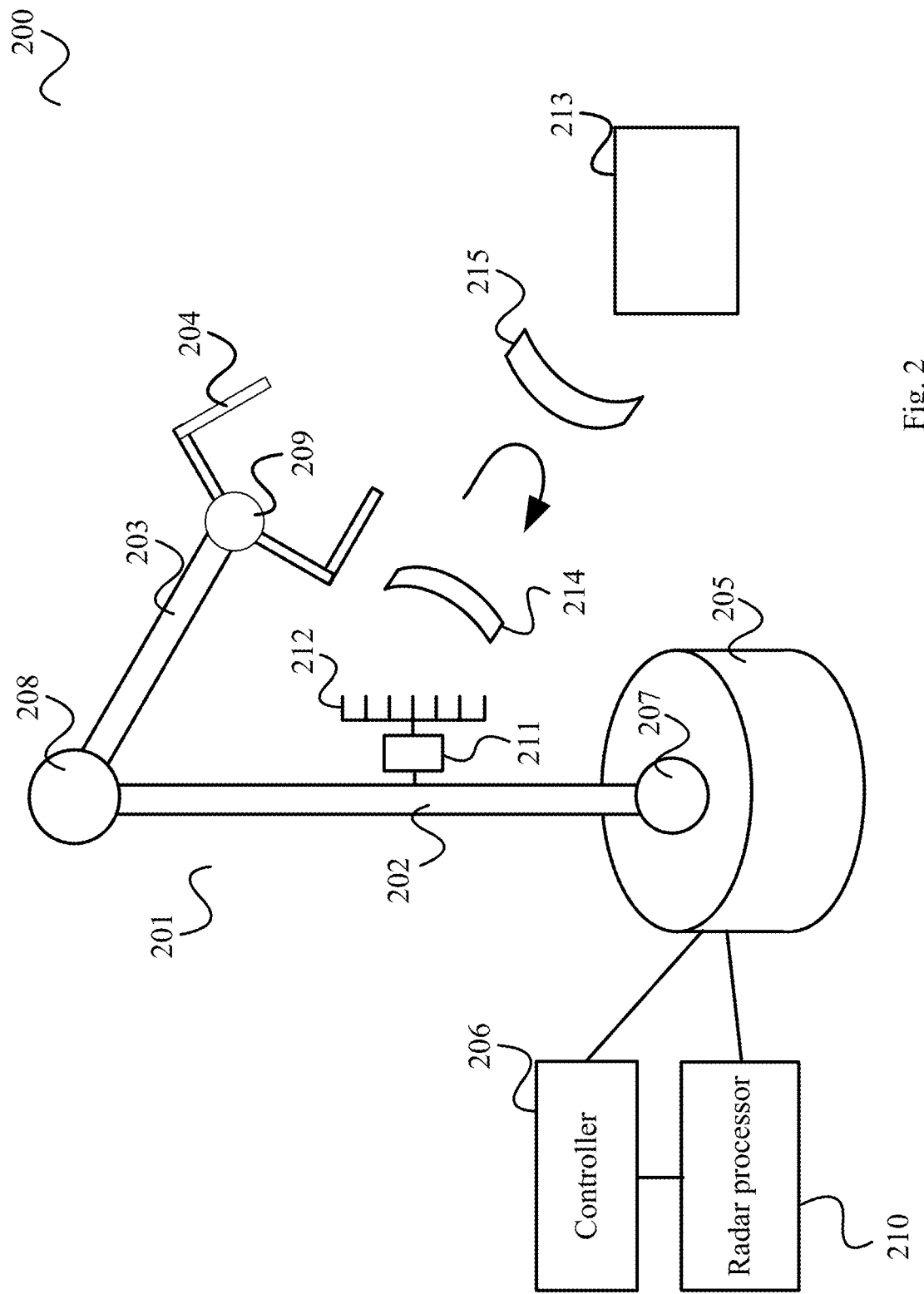
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar frontend 211 and a radar antenna arrangement 212 may be coupled to the radar processor 210. In one example, radar fronted 211 and/or radar antenna arrangement 212 may be included, for example, as part of the robot arm 201. For example, a location and/or orientation of a radar signal transmission source and/or a radar signal reception sink may be physically moved within the reach of the robot arm. In another example, the source and/or the sink of radar signals may be attached to a non-movable, fixed part of the robot arm, e.g., a base of the robot arm or a stationary part of the arm, or installed in an environment, e.g., in a suitable vicinity of robot arm. In another example, the robot may be an autonomous robot with a robot arm.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
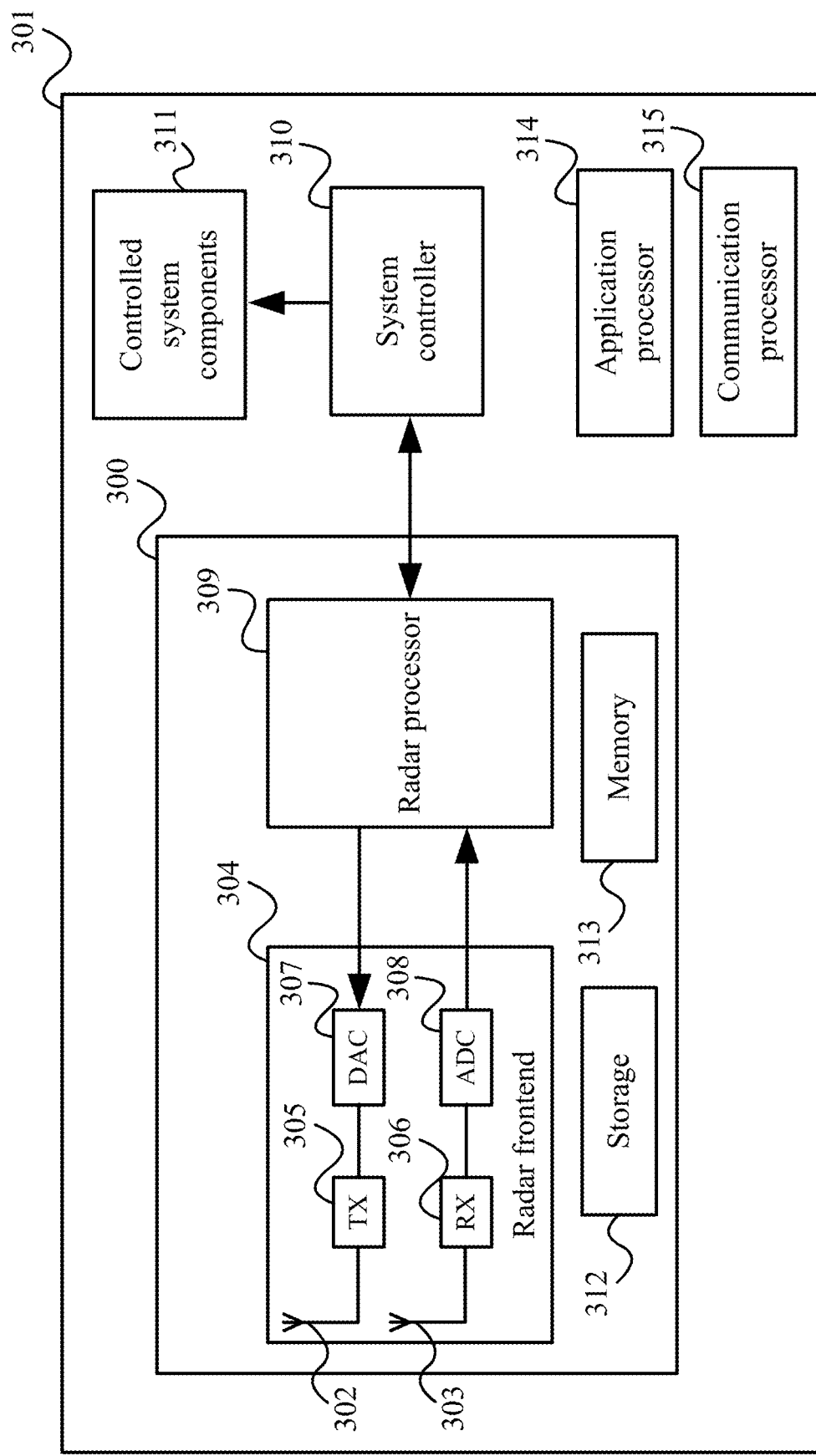
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
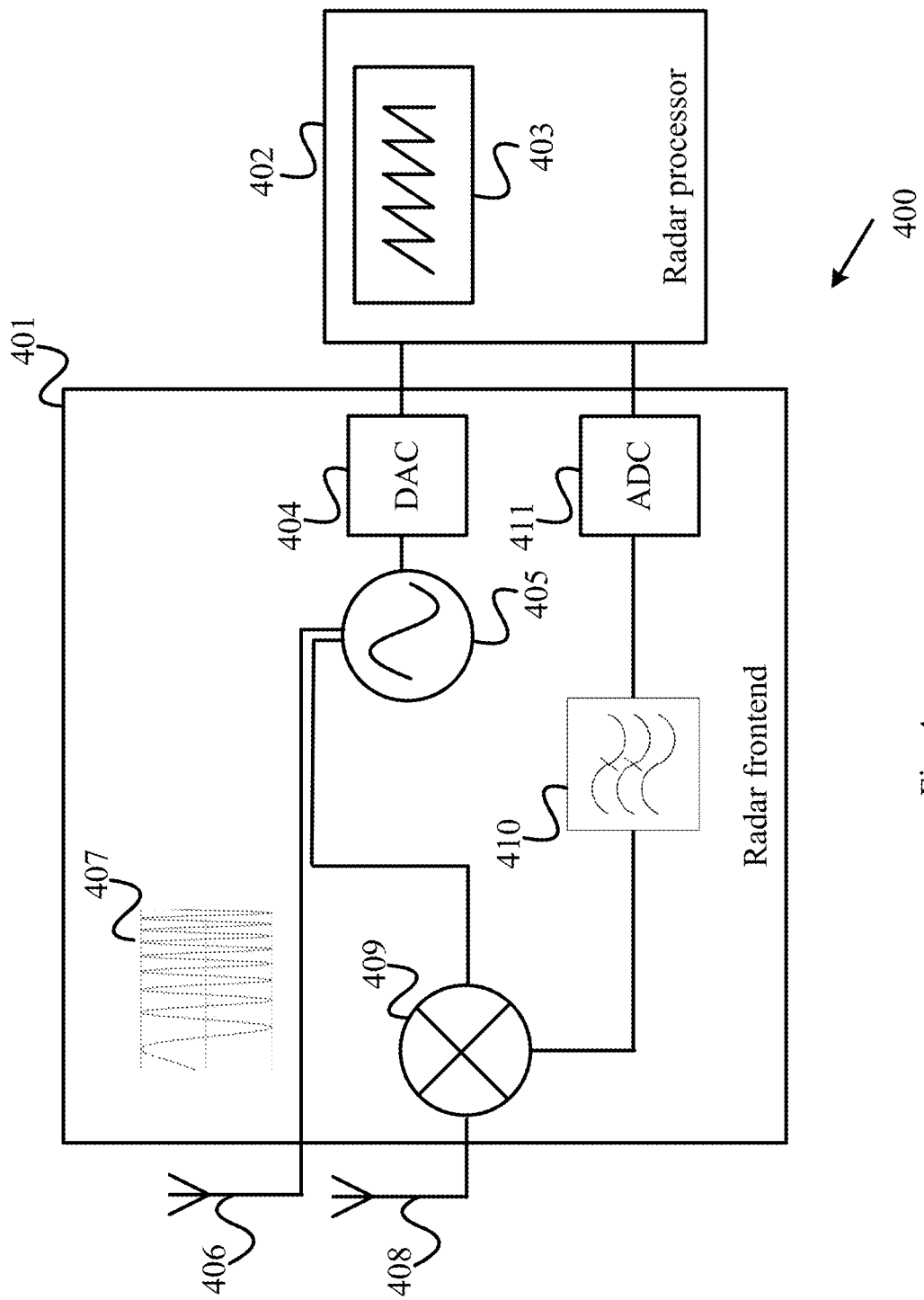
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
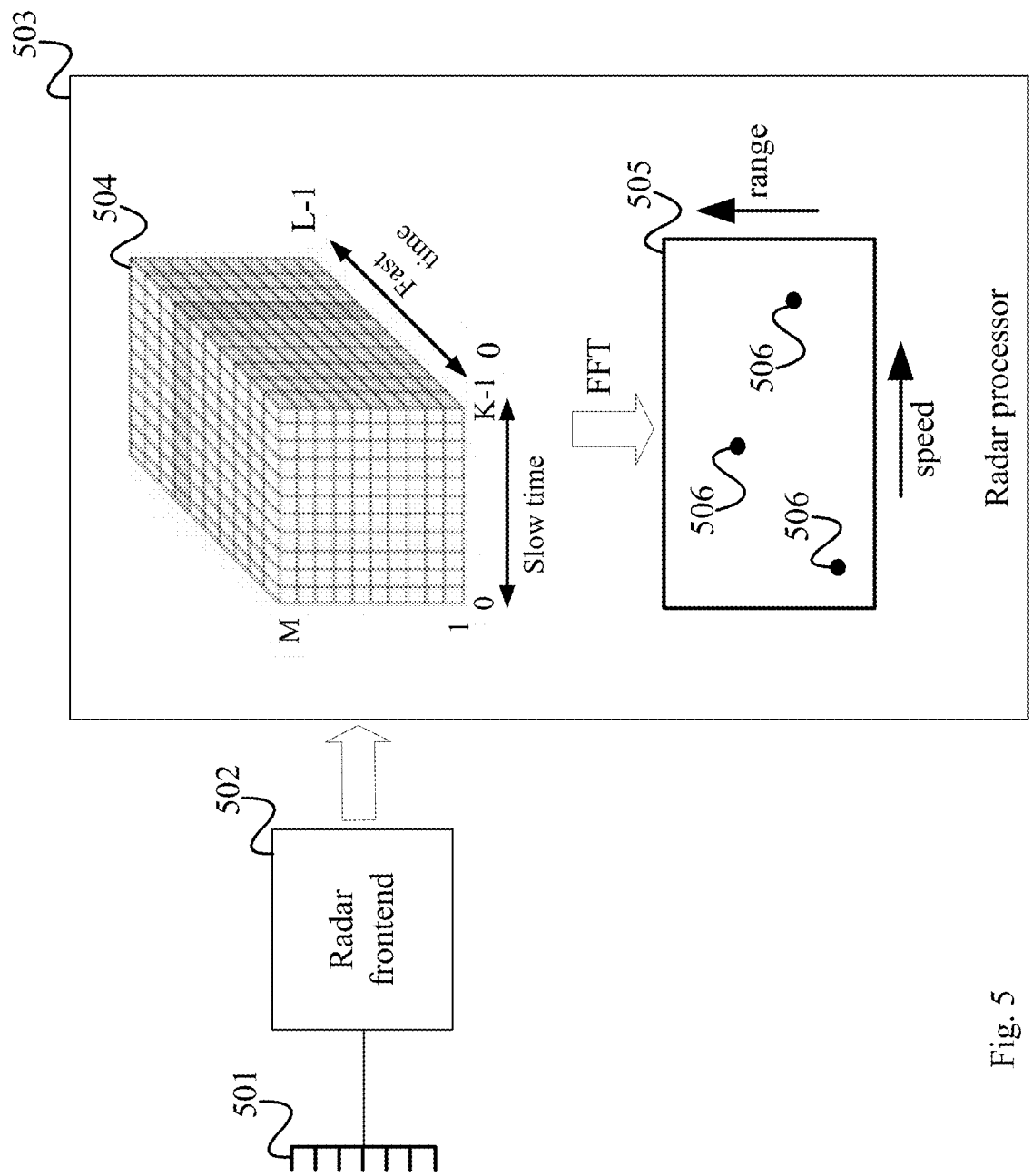
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
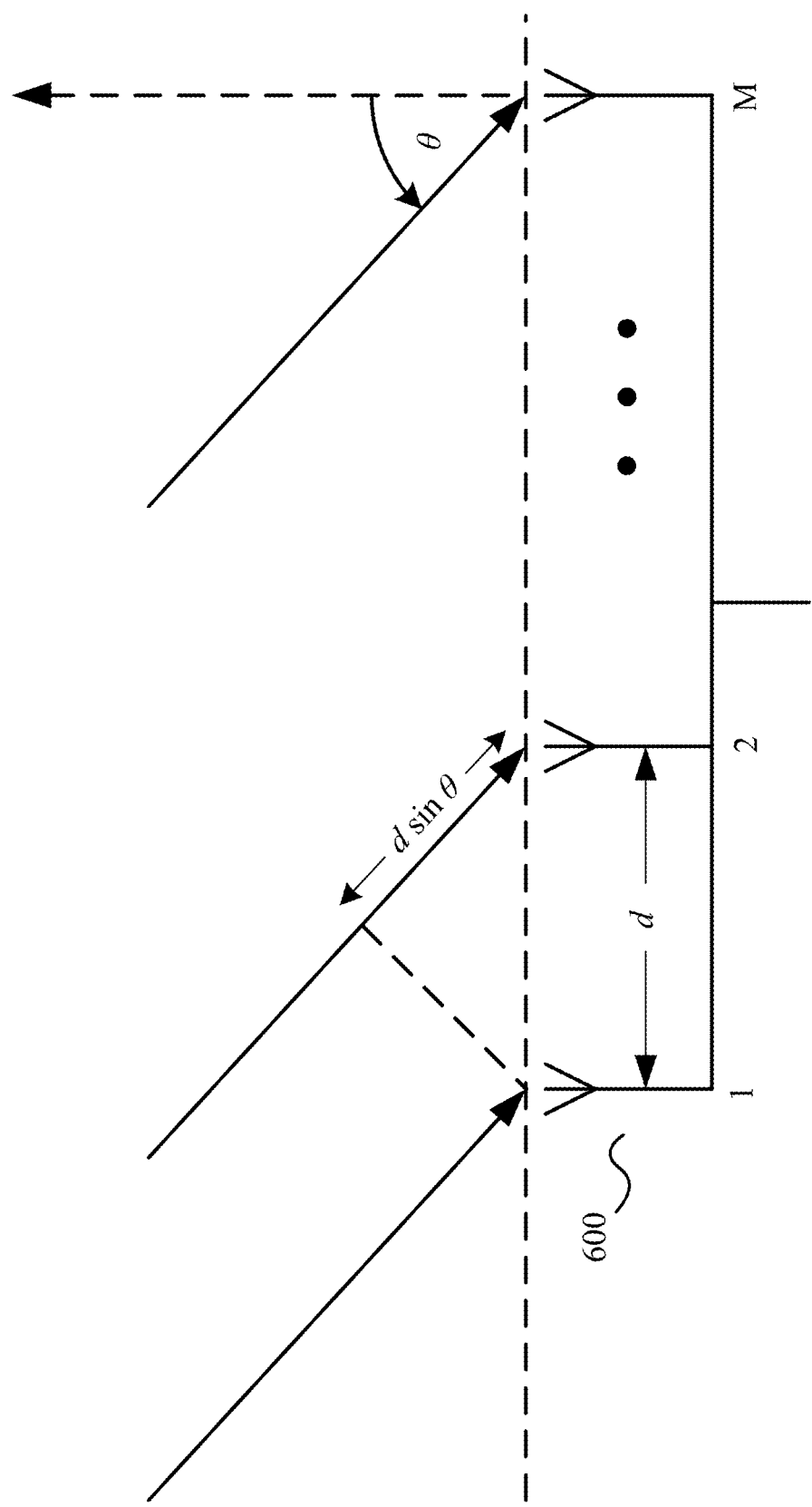
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
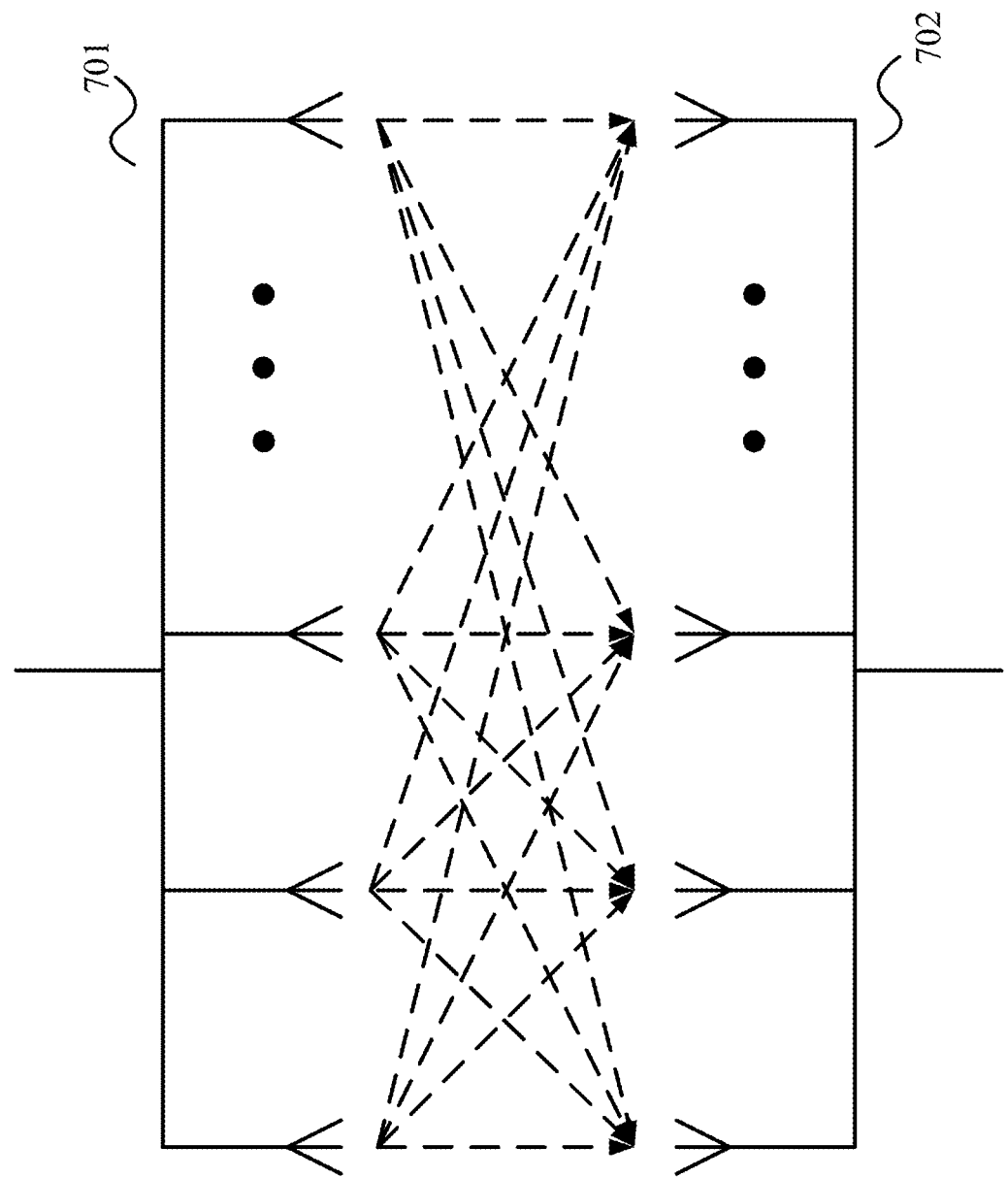
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
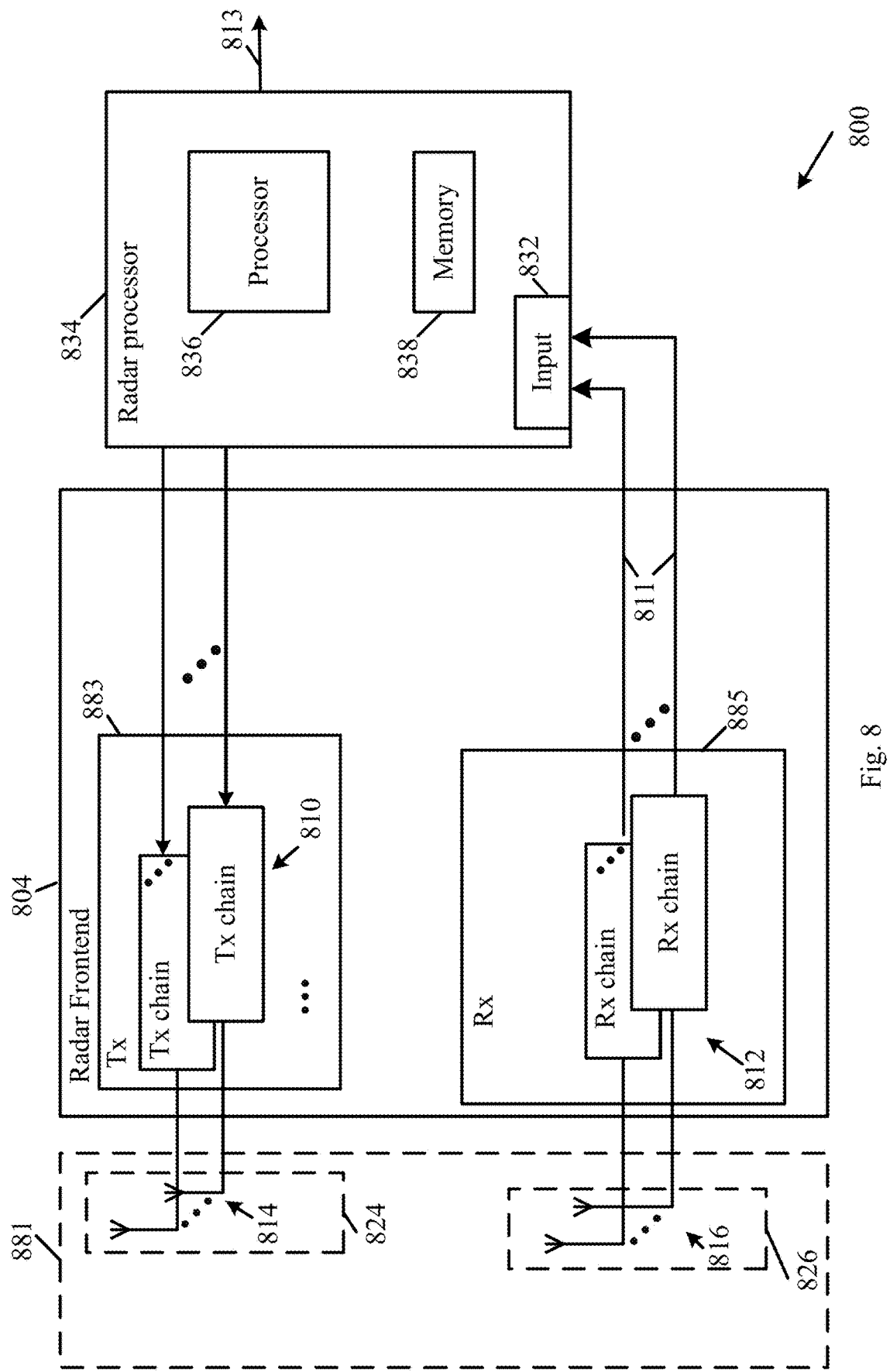
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/ receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
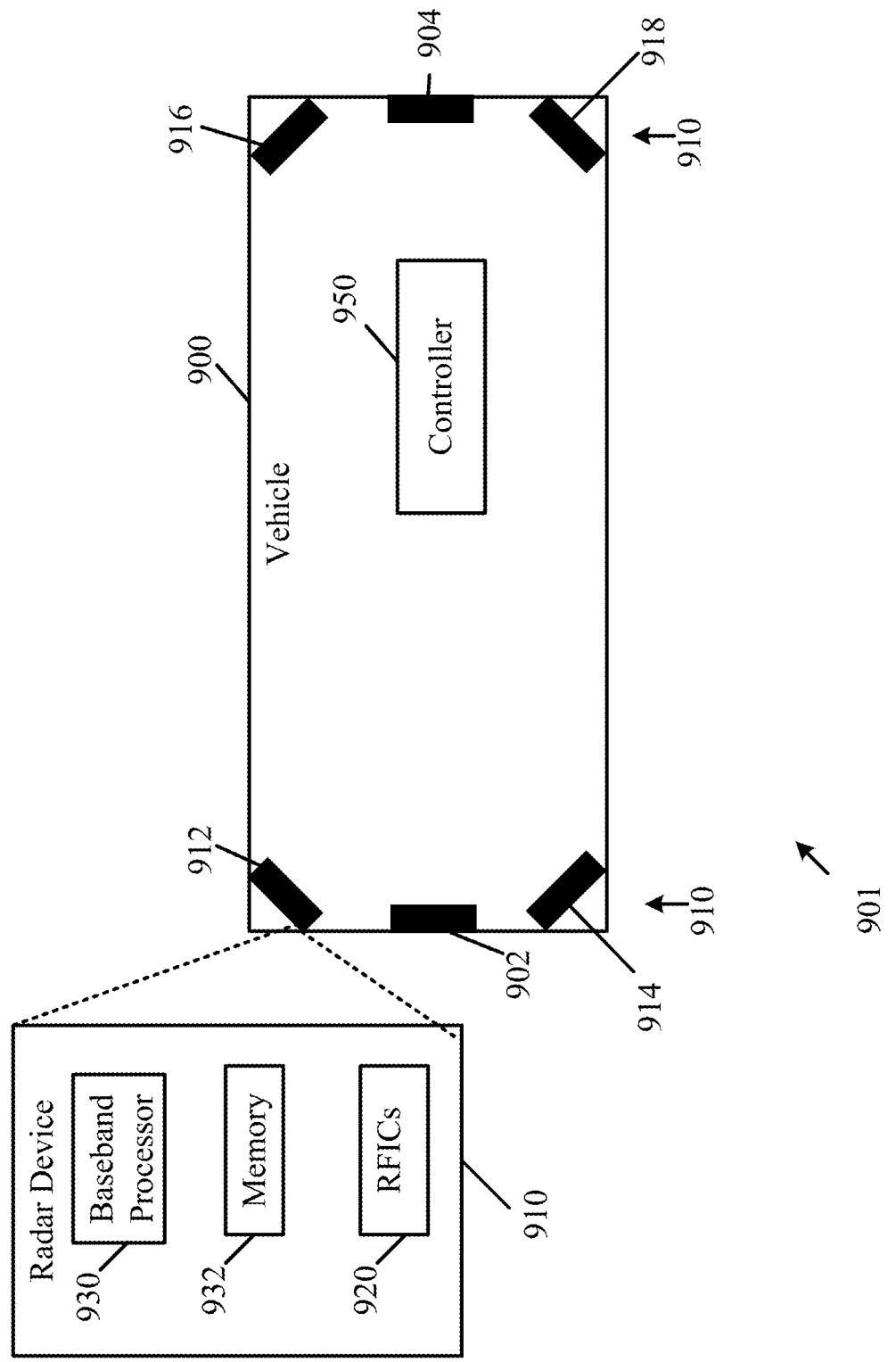
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

For example, the plurality of radar devices 910 may be positioned at one or more locations, e.g., at one or more heights, for example, at different height locations, e.g., at a bumper height, a headlight height, a Facia center/top corners/roof height, and/or any other location.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU)"), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, baseband processor 930 and/or controller 950 may be configured to generate and/or process PC radar information based on radar signals communicated by one or more of radar devise 910, e.g., as described below.

Figure 10:
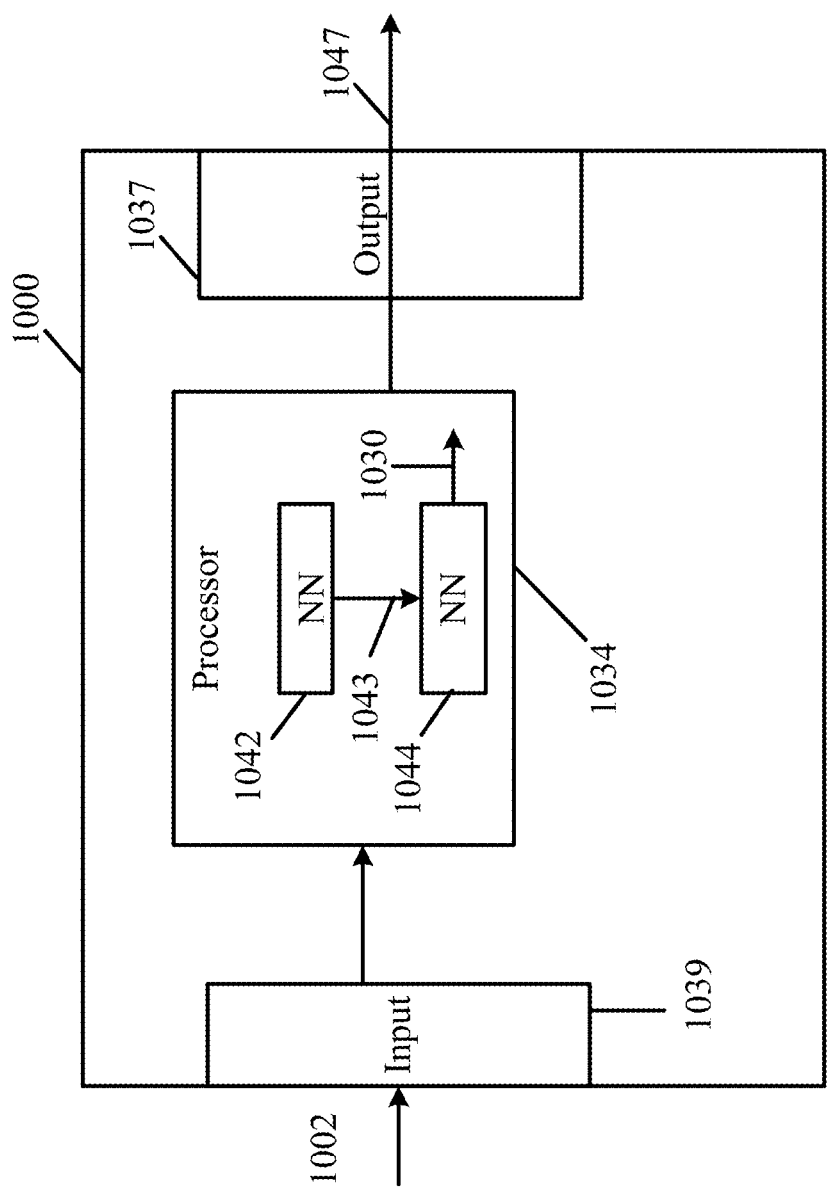
FIG. 10 is a schematic illustration of a processor apparatus, in accordance with some demonstrative aspects.

Reference is made to FIG. 10, which schematically illustrates a processor apparatus 1000, in accordance with some demonstrative aspects.

In some demonstrative aspects, apparatus 1000 may be configured to process PC radar information 1002, e.g., as described below.

In some demonstrative aspects, apparatus 1000 may be implemented, for example, as part of a radar device, e.g., a radar device 910.

In some demonstrative aspects, apparatus 1000 may be implemented, for example, as part of a controller, e.g., controller 950.

In some demonstrative aspects, apparatus 1000 may be implemented, for example, as part of a radar processor, e.g., radar processor 834 (FIG. 8), and/or BB processor 930 (FIG. 9).

In some demonstrative aspects, apparatus 1000 may include an input 1039 to receive the PC radar information 1002, for example, from one or more elements of a radar system, e.g., as described below. In one example, PC radar information 1002 may be provided by another processor of the radar system. In one example, PC radar information 1002 may be generated and/or provided by processor 836 (FIG. 8), for example, based on the radar Rx data 811 (FIG. 1). In another example, PC radar information 1002 may be generated and/or provided by BB processor 930 (FIG. 9), for example, based on radar signals communicated by the radar device 910 (FIG. 9). In another example, PC radar information 1002 may be generated provided by controller 950 (FIG. 9), for example, based on radar signals communicated by the plurality of radar devices 910 (FIG. 9). In other aspects, PC radar information 1002 may be generated provided by any other element of a radar device and/or radar system, e.g., radar device 800 (FIG. 8) and/or radar system 901 (FIG. 9).

In some demonstrative aspects, the PC radar information 1002 may be based on radar Rx data 811 (FIG. 8).

In one example, processor 836 (FIG. 8) may be configured to provide the PC radar information 1002 to input 1039.

In some demonstrative aspects, the PC radar information 1002 may include radar detection information of a plurality of possible detections, e.g., as described below.

In some demonstrative aspects, the radar detection information corresponding to a possible detection of the plurality of possible detections may include information of a plurality of radar attributes of the possible detection, e.g., as described below.

In some demonstrative aspects, the plurality of radar attributes of the possible detection may include a three dimensional (3D) position of the possible detection, an energy level of the possible detection, and/or a Doppler value of the possible detection e.g., as described below.

In other aspects, the plurality of radar attributes of the possible detection may include only some of the attributes described herein, and/or any other additional or alternative radar attributes of the possible detection.

In some demonstrative aspects, apparatus 1000 may include a processor 1034 configured to process the PC radar information 1002, e.g., as described below. For example, radar processor 834 (FIG. 8) may include one or more elements of processor 1034, and/or may perform one or more operations and/or functionalities of processor 1034; BB processor 930 (FIG. 9) may include one or more elements of processor 1034, and/or may perform one or more operations and/or functionalities of processor 1034; and/or controller 950 (FIG. 9) may include one or more elements of processor 1034, and/or may perform one or more operations and/or functionalities of processor 1034.

In some demonstrative aspects, processor 1034 may include, or may be implemented, partially or entirely, by circuitry and/or logic, e.g., one or more processors including circuitry and/or logic, memory circuitry and/or logic. Additionally or alternatively, one or more functionalities of processor 1034 may be implemented by logic, which may be executed by a machine and/or one or more processors, e.g., as described below.

In some demonstrative aspects, processor 1034 may be configured to determine radar target information 1047, for example, based on PC radar information 1002, e.g., as described below.

In some demonstrative aspects, the radar target information 1047 may include, may be based on, may represent and/or may indicate, one or more valid detections, e.g., as described below.

In some demonstrative aspects, system 1000 may include an output 1037, for example, to output the radar target information 1047.

In some demonstrative aspects, processor 1034 may be configured to identify one or more valid detections in the plurality of possible detections, and to determine the radar target information 1047, for example, based on the valid detections, e.g., as described below.

In some demonstrative aspects, the valid detections may include one or more possible detections, which are classified as valid detections.

In some demonstrative aspects, the valid detections may include one or more possible detections, which may be determined to probably be true targets, e.g., as described below.

In some demonstrative aspects, the valid detections may include possible detections, which are not determined to probably be False Alarm (FA) detections. For example, the FA detections may include ghost targets and/or non-valid/non-true detections.

In some demonstrative aspects, the valid detections may include one or more possible detections, which are to be classified as true targets, for example, based on one or more target classification criteria and/or target detection criteria.

In other aspects, the valid detections may be defined according to any other criteria.

In some demonstrative aspects, processor 1034 may be configured to identify the one or more valid detections, for example, in one or more scenes and/or scenarios, e.g., as described below.

In some demonstrative aspects, processor 1034 may be configured to identify the one or more valid detections, for example, in a multipath scenario, e.g., as described below.

For example, a multipath scenario may include multipath signals from a plurality of paths between a radar antenna, e.g., radar antenna 881 (FIG. 8), and a target, e.g., as described below.

For example, in a multipath scenario there may be multiple paths in which radar signals may travel from a radar antenna to a true target and from the true target back to the radar antenna.

For example, in the multipath scenario, the radar antenna may receive a direct reflection from a true target via a direct path, for example, when a Tx angle, denoted $\theta^t$, at which a Tx radar signal is transmitted from the radar antenna, is equal to an Rx angle, denoted $\theta^r$, at which the radar antenna receives a reflection of the Tx radar signal from the true target, e.g., $\theta^t = \theta^r$. In such a case, a true range of the true target may be determined, e.g., based on the Tx radar signal and the Rx radar signal communicated via the direct path.

However, in the multipath scenario there may be one or more additional indirect paths, in which the radar signals may travel from the radar antenna to the true target and from the true target back to the radar antenna, for example, via one or more reflectors, e.g., one or more other targets.

For example, an indirect path may be characterized by a Tx angle which may be different from an Rx angle, e.g., $\theta^t \neq \theta^r$.

For example, an indirect reflection via an indirect path corresponding to a true target may be viewed as a false-alarm target, or a ghost target, which may be located at a longer range than the true range of the true target.

In some demonstrative aspects, a radar device, e.g., radar device 910 (FIG. 9) may be required to operate in one or more diverse and/or difficult scenarios, e.g., in environments including a multipath scenario.

In some demonstrative aspects, the radar device may be required to operate, for example, in dense urban environments, for example, to detect one or more targets such as vehicles, pedestrians, cyclists and/or the like, for example, while providing high detection probability.

In some demonstrative aspects, the radar device may be required to provide detection, e.g., fast detection, of small obstacles and/or objects.

In some demonstrative aspects, the radar device may be required to provide a high resolution image, e.g., an image-like resolution, in some or all dimensions, for example, to support detection of small obstacles and/or objects.

In one example, a high resolution image may necessitate a very large antenna array.

In some demonstrative aspects, a high angular resolution may be achieved, for example, by implementing a MIMO array, for example, radar antenna 881 (FIG. 8), e.g., instead of using a very large antenna array.

In some demonstrative aspects, the MIMO array may exhibit many FAs, e.g., due to multipath ambiguities.

In some demonstrative aspects, there may be a need to provide a technical solution, which may support efficient rejection and/or filtering of the FAs.

In some demonstrative aspects, there may be a need to provide a technical solution for radar devices to reject/filter the FA detections, and/or to identify valid detections, for example, while providing a fast detection of small objects and/or obstacles, e.g., using a MIMO array.

In one example, it may be difficult to detect and/or reject FAs exhibited by a MIMO array due to the multipath ambiguities, for example, when implementing model-based detection methods, e.g., as described below.

In some demonstrative aspects, there may be one or more technical disadvantages, inefficiencies, and/or problems, for example, in some use cases, implementations and/or scenarios, for example, when using heuristic detectors, for example, to detect valid targets and/or to reject FAs. For example, the heuristic detectors may be hand-coded to detect targets around a radar device.

In one example, the heuristic detectors may be simple and/or fast to implement. However, the heuristic detectors may exhibit poor performance, for example, in complex environments, for example, due to internal noise elements and/or due to difficulties in estimating multi-path effects. For example, in some instances, a radar system may employ filtering over time, for example, to reduce an amount of FAs that are inconsistent along several time steps.

In another example, implementing a high-end detector may require specific tailoring of all noise sources into heuristic detection algorithms, for example, to accommodate for a specific antenna array and unique errors of each radar design, e.g., whether because of imperfections and/or lack of modeling.

In some demonstrative aspects, there may be one or more technical disadvantages, inefficiencies, and/or problems, for example, in some use cases, implementations and/or scenarios, for example, when using temporal filters, for example, to detect valid targets and/or to reject FAs. For example, the temporal filters may require a large amount of timesteps to remove FAs that are inconsistent over time.

In one example, an output of a temporal filter may either keep many of the FAs and/or introduce latencies in detecting real targets, for example, as more FAs appear and disappear between timesteps.

In some demonstrative aspects, temporal filtering may be implemented as an orthogonal solution, for example, to perform temporal filtering applied over measurements at output 1047.

In some demonstrative aspects, processor 1034 may be configured to classify the plurality of possible detections as valid detections or as false alarm detections, e.g., as described below.

In some demonstrative aspects, processor 1034 may be configured to label and/or filter radar false alarms, e.g., as described below.

In some demonstrative aspects, processor 1034 may be configured to classify the plurality of possible detections, for example, using a Neural Network (NN), e.g., as described below.

In some demonstrative aspects, the NN may be trained by considering the problem of classifying the possible detections as a semantic segmentation with two classes, e.g., as described below.

In some demonstrative aspects, detections according to one or more reference detection mechanisms, e.g., LIDAR detections and/or any other detections, may be used as ground truth (GT), for example, to label the radar detections and/or measurements, e.g., as described below.

In other aspects, the NN may be trained based on any other additional or alternative training data and/or algorithm.

In some demonstrative aspects, an implementation of classifying the plurality of possible detections based on the NN may provide results, which significantly outperform hand-coded heuristics, for example, with reasonable compute complexity, e.g., as described below.

In some demonstrative aspects, an implementation of classifying the plurality of possible detections based on the NN may provide a technical solution to improve accuracy and/or may enhance reliability of a radar system e.g., radar system 100 (FIG. 1), e.g., as described below.

In some demonstrative aspects, an implementation of classifying the plurality of possible detections based on the NN may provide a technical solution to filter some, many, or even all, of the radar's FAs, for example, while keeping all, or almost all, valid detections, e.g., as described below.

In some demonstrative aspects, an implementation of classifying the plurality of possible detections based on the NN may provide a technical solution, which may utilize reduced, e.g., minimal, preprocessing and/or post processing, and/or may be employed in real time on device hardware, e.g., as described below.

In some demonstrative aspects, an implementation of classifying the plurality of possible detections based on the NN may provide a technical solution to support design of an optimized detector under multiple constraints, which may outperform some or all heuristic methods, e.g., as described below.

In some demonstrative aspects, an implementation of classifying the plurality of possible detections based on the NN may provide a technical solution to enable deployment of a radar system, e.g., radar system 100 (FIG. 1), for example, in various areas, which may be considered as impossible for operation of radar systems, e.g., as described below.

In some demonstrative aspects, an implementation of classifying the plurality of possible detections based on the NN may provide a technical solution to reduce a number of FAs, which may be relatively high, for example, in dense multipath scenarios, e.g., as described below.

In some demonstrative aspects, processor 1034 may be configured to determine a plurality of validity scores 1030 corresponding to the plurality of possible detections, for example, based on the radar detection information of the plurality of possible detections in PC radar information 1002, e.g., as described below.

In some demonstrative aspects, a validity score corresponding to the possible radar detection may indicate whether it is more probable that the possible detection is a valid detection or a FA detection, e.g., as described below.

In some demonstrative aspects, processor 1034 may be configured to generate radar target information 1047 based on the plurality of validity scores 1030 corresponding to the plurality of possible detections e.g., as described below.

In some demonstrative aspects, processor 1034 may be configured to generate the radar target information 1047 to include a vector of the plurality of validity scores 1030 corresponding to the plurality of possible detections, e.g., as described below.

In some demonstrative aspects, processor 1034 may be configured to generate the radar target information 1047 to include a list of valid detections including one or more possible detections of the plurality of possible detections of PC radar information 1002, which are determined as valid, for example, based on the plurality of validity scores 1030, e.g., as described below.

In other aspects, processor 1034 may be configured to generate the radar target information 1047 in any other format and/or including any other additional or alternative information based on the plurality of validity scores 1030.

In some demonstrative aspects, processor 1034 may be configured to determine that a possible detection is a valid detection, for example, based on a determination that the validity score corresponding to the possible detection is above a predefined validity threshold, e.g., as described below.

In some demonstrative aspects, processor 1034 may be configured to determine a Two Dimensional (2D) image including a plurality of pixels, for example, based on the PC radar information 1002, e.g., as described below.

In some demonstrative aspects, processor 1034 may be configured to determine the plurality of validity scores 1030 corresponding to the plurality of possible detections, for example, based on the 2D image, e.g., as described below.

In some demonstrative aspects, a pixel of the plurality of pixels corresponding to a possible detection may be based on the plurality of radar attributes of the possible detection, e.g., as described below.

In some demonstrative aspects, a pixel position of the pixel in the 2D image may be based on the 3D of the possible detection, e.g., as described below.

In some demonstrative aspects, processor 1034 may be configured to determine one or more properties of the pixel corresponding to the possible detection, for example, based on the energy level of the possible detection, the Doppler value of the possible detection, and/or an elevation value of the 3D position of the possible detection, e.g., as described below.

In some demonstrative aspects, processor 1034 may be configured to determine feature information 1043 of the plurality of possible detections in PC radar information 1002, for example, based on the 2D image, e.g., as described below.

In some demonstrative aspects, processor 1034 may be configured to determine the plurality of validity scores 1030 corresponding to the plurality of possible detections in PC radar information 1002, for example, based on the feature information 1043 of the plurality of possible detections and the radar detection information of the plurality of possible detections in PC radar information 1002, e.g., as described below.

In some demonstrative aspects, feature information 1043 corresponding to a possible detection may include one or more segmentation parameters corresponding to a segmentation of the pixel in the 2D image, e.g., as described below.

In some demonstrative aspects, processor 1034 may include a Neural Network (NN) 1042 trained to generate the feature information 1043 of the plurality of possible detections in PC radar information 1002, for example, based on an NN input including the 2D image, e.g., as described below.

In some demonstrative aspects, NN 1042 may include a convolutional neural network, e.g., as described below.

In some demonstrative aspects, NN 1042 may include a U-NET, e.g., as described below.

In other aspects, NN 1042 may include any other neural network.

In some demonstrative aspects, processor 1034 may be configured to determine augmented PC information corresponding to the plurality of possible detections in PC radar information 1002, for example, based on the PC radar information in PC radar information 1002 and the feature information 1043, e.g., as described below.

In some demonstrative aspects, processor 1034 may be configured to determine the plurality of validity scores 1030 corresponding to the plurality of possible detections in PC radar information 1002, for example, based on the augmented PC information, e.g., as described below.

In some demonstrative aspects, the augmented PC information may include a plurality of augmented sets of information corresponding to the plurality of possible detections in PC radar information 1002, e.g., as described below.

In some demonstrative aspects, a set of augmented information corresponding to a possible detection may include the radar detection information corresponding to a possible detection in PC radar information 1002, and the feature information 1043 corresponding to the possible detection, e.g., as described below.

In some demonstrative aspects, processor 1034 may include a NN 1044 trained to generate the plurality of validity scores 1030 corresponding to the plurality of possible detections in PC radar information 1002, for example, based on an NN input including the augmented PC information, e.g., as described below.

In some demonstrative aspects, NN 1044 may include a Pointnet, e.g., as described below.

In other aspects, NN 1044 may include any other neural network, e.g., as described below.

In some demonstrative aspects, processor 1034 may include a first NN, e.g., NN 1042, trained to generate the feature information 1043 of the plurality of possible detections, for example, based on the 2D image: and a second NN, e.g., NN 1044, trained to generate the plurality of validity scores 1030 corresponding to the plurality of possible detections, for example, based on the plurality of augmented sets of information corresponding to the plurality of possible detections in PC radar information 1002, e.g., as described below.

In some demonstrative aspects, processor 1034 may include a NN trained to perform the functionality of both the first NN, e.g., NN 1042, and the second NN, e.g., NN 1044.

Figure 11:
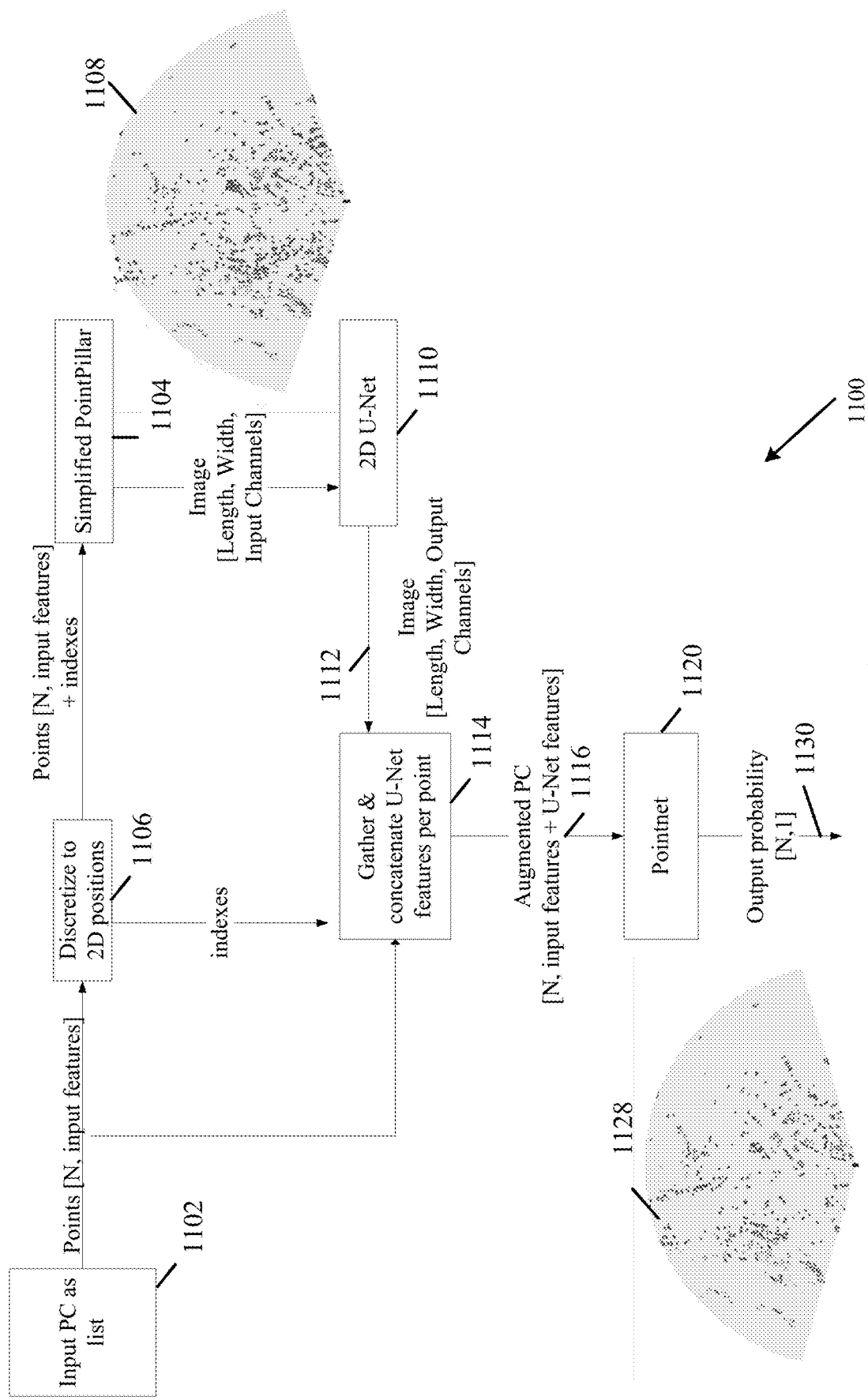
FIG. 11 is a schematic illustration of a processing scheme to process point cloud radar information, in accordance with some demonstrative aspects.

Reference is made to FIG. 11, which schematically illustrates a processing scheme 1100 to process PC radar information 1102, in accordance with some demonstrative aspects.

In one example, processor 1034 (FIG. 10) may perform one or more operations and/or functionalities of processing scheme 1100, for example, to process the PC radar information 1002 (FIG. 10).

In some demonstrative aspects, as shown in FIG. 11, the PC radar information 1102 may be received as an input e.g., by processor 1034 (FIG. 10).

In some demonstrative aspects, processing scheme 1100 may be configured to process the PC radar information 1102 based on the a 2-class semantic segmentation of the PC radar information 1102, for example, where the classes are "valid" and "FA", e.g., as described below.

In some demonstrative aspects, the PC radar information 1102 may include, for example, detection information of a plurality of possible detections. In one example, the detection information may be generated by a detector, e.g., a Constant False Alarm Rate detector (CFAR), or any other detector.

In some demonstrative aspects, the PC radar information 1102 may include a list of a plurality of N detections.

In some demonstrative aspects, the PC radar information 1102 may include for an n-th possible detection a plurality of attributes corresponding to the n-th possible detection.

In some demonstrative aspects, the plurality of attributes corresponding to the n-th possible detection may include a three dimensional (3D) position of the n-th possible detection, an energy level of the n-th possible detection, and/or a Doppler value of the n-th possible detection In some demonstrative aspects, the PC radar information 1102 for the n-th possible detection may include, for example, an azimuth, an elevation, a range, a Doppler, and/or an energy of the n-th possible detection.

In some demonstrative aspects, as shown in FIG. 11, the processing scheme 1100 may be configured to output a vector 1130 corresponding to the possible detections in the PC radar information 1102. For example, the vector 1130 may have a same length as the number of possible detections in the PC radar information 1102.

In some demonstrative aspects, vector 1130 may include a plurality of probability values corresponding to the plurality of possible detections in the PC radar information 1102. For example, a probability value in the vector 1130 may indicate a probability that a possible detection corresponding to the probability value is a "valid detection" or a "FA detection".

In one example, vector 1130 may include a plurality of probability values, for example, in a range [0,1] or any other range. For example, the probability values in vector 1130 may be configured to signify a marginal posterior probability of the respective possible detections in the PC radar information 1102 to be a "valid detection" or a "FA detection".

In one example, vector 1130 may be utilized to generate a detection map 1128 including a plurality of points corresponding to a plurality of valid detections, e.g., according to a radar coordinate frame.

In some demonstrative aspects, detection map 1128 may not include one or more of the plurality of possible detections in the PC radar information 1102, for example, one or more FA detections, which may be filtered out by processing scheme 1100.

In some demonstrative aspects, processing scheme 1100 may implement a combination of two NNs, for example, including a first NN, for example, a convolutional NN, e.g., a U-Net network 1110 or any other network; and a second NN, e.g., including a Pointnet network 1120 or any other NN.

In other aspects, NN 1110 and/or NN 1120 may include any other type of NN.

In some demonstrative aspects, as indicated by a block 1104, the PC radar information 1102 may be transformed into a 2D image 1108, e.g., representing a Bird eye View (BeV) of the radar detections, for example, in the form of a simplified point-pillar image.

In some demonstrative aspects, as indicated by a block 1106, the 2D image 1108 may be generated, for example, by discretizing a 2D position of a possible detection, e.g., each detection, for example, as may be seen in a radar frame, and using attributes of the possible detection, e.g., a mean ego-speed corrected Doppler value, the energy level, and/or the elevation value, as input channels to the 2D image 1108.

In some demonstrative aspects, as shown in FIG. 11, a U-net architecture 1110, e.g., having a final layer at a same spatial size as the input, may be applied to the 2D image 1108, for example, to generate feature information 1112 corresponding to the possible detection.

In some demonstrative aspects, as indicated by block 1114, feature information 1112 may be collected from the output of the U-Net 1110, for example, for discretized bins, e.g., each of the discretized bins.

In some demonstrative aspects, the feature information 1112 may be treated as extra features for points in the PC radar information 1102, e.g., for every point in the PC radar information 1102, e.g., that may be binned to a location.

In some demonstrative aspects, as shown in FIG. 11, augmented PC information 1116, which may be based on feature information 1112 and PC radar information 1102, may be provided as an input to the Pointnet 1120.

In some demonstrative aspects, as shown in FIG. 11, Pointnet 1120 may output vector 1130 including, for example, a single sigmoid per each input point of PC radar information 1102, for example, based on the augmented PC information 1116.

In some demonstrative aspects, statistics information, e.g., including general statistics, may be provided from one or more lower radar layers as additional input to the Pointnet network 1120. For example, the statistics information may relate to an environment in which a radar device may be operating. For example, the statistics information may relate to statistics of an estimated scene type, and/or an environment, e.g., a highway, in which the radar device may be operating. In one example, the general statistics may be encoded as a scalar to the PC radar information 1102.

In some demonstrative aspects, the networks 1110 and/or 1120 may be trained with a cost function, e.g., a 2-class cross entropy loss function, and/or any other cost function.

In some demonstrative aspects, detections without a label, e.g., possible detections which are not clearly classified as either valid detections or FA detections, may be ignored at a calculation of the cost function.

In some demonstrative aspects, the cost function may be normalized, e.g., according to a number of known points in each frame, e.g., to address a change the number of detections, which may change drastically between frames.

In some demonstrative aspects, quantitative results corresponding to the processing scheme 1100 may be determined in the form of relative delta-accuracy, e.g., as follows:

$$\frac{\text{number\_of\_errors\_in\_input\_PC} - \text{number\_of\_errors\_in\_output\_PC}}{\text{number\_of\_errors\_in\_input\_PC}}$$

For example, a relative-delta accuracy of 100% may be defined to mean that the processing scheme 1100 is able to detect and/or filter all FA detections, for example, while keeping all valid detections.

In some demonstrative aspects, the quantitative results may be measured on radar frames, which are not included in a training procedure of processing scheme 1100.

In one example, the following delta-accuracies for static detections and/or moving detections may be determined, for example, based on measurements on radar frames aggregated over more than 20 hours:

TABLE 1

| Static Detections | Moving Detections | Total |
| --- | --- | --- |
| 29.6% | 85.0% | 49.3% |

In one example, detections may be marked "static" or "moving" according to their reported Doppler.

In some demonstrative aspects, a training process and/or procedure may be performed, for example, to train the processing scheme 1100 including NN 1110 and NN 1120.

In some demonstrative aspects, the training process may be performed automatically and, accordingly, may not require manual calibration of a radar system, for example, when one or more attributes and/or inputs of the radar system change.

In some demonstrative aspects, the training process may be configured to provide a technical solution utilizing minimal preprocessing and/or post processing of radar information.

In some demonstrative aspects, the training process may be configured to provide a technical solution, which may be employed in real time, e.g., on device hardware.

In some demonstrative aspects, the training process may be configured to label radar detections and/or measurements, for example, by comparing the measurements to reference detections, for example, LIDAR detections of a LIDAR system, e.g., as described below.

For example, LIDAR detections may be used as a ground truth (GT), for example, to label the radar detections and/or measurements in the training of the processing scheme 1100.

In other aspects, any other reference detections by any other reference detection scheme, e.g., utilizing any other sensors, may be implemented for labeling radar detections and/or measurements.

In some demonstrative aspects, LIDAR detections may be collected from a LIDAR sensor, which may be synchronized and/or calibrated to a radar sensor, e.g., radar device 910 (FIG. 9).

In other aspects, any other sensor, e.g., depth cameras and/or the like, may be used for labeling the radar detections, for example, as long as the final result may be an expected point cloud.

In some demonstrative aspects, a labeling process may be configured to automatically generate labels, for example, by comparing the LIDAR detections to the radar detections generated by processing scheme 1100.

In some demonstrative aspects, the LIDAR may be assumed to exhibit minimal FAs and/or misdetections, e.g., compared to detections of a radar system.

In some demonstrative aspects, a large and useful dataset may be created, for example, based on the LIDAR detections, for example, even without employing sophisticated LIDAR based tracking and detection mechanisms, e.g., as described below.

In some demonstrative aspects, at a radar frame, e.g., at each frame, valid radar detections may be marked as "ones", for example, if the radar detections fall approximately near LIDAR detections.

In some demonstrative aspects, FA detections may be marked as "ones", for example, in case a LIDAR ray passes close enough to the radar detection and no LIDAR point is associated with the radar detection.

In some demonstrative aspects, one or more operations may be applied to augment the dataset labeling process, e.g., as described below.

In some demonstrative aspects, a radar detection, e.g., each radar detection, may include a Doppler value, which may be translated into radial speed in a local coordinate frame, e.g., relative to the road.

In some demonstrative aspects, an expected radial speed of a LIDAR ray may be estimated in several ways, e.g., which may differ in accuracy, robustness and/or complexity.

In some demonstrative aspects, an occupancy map for the LIDAR may be created, for example, over several different time lengths.

In some demonstrative aspects, the occupancy map may be used to mark some of the detections as belonging to moving targets or stationary targets, and accordingly, comparing to the ego-speed corrected Doppler given by the radar device.

In some demonstrative aspects, when a time length of the occupancy map is long, e.g., in an order of seconds, a target moving in the scene may be expected to be removed by the averaging mechanism used by the occupancy map generation.

In some demonstrative aspects, the LIDAR measurements at a frame, e.g., at each frame, may be compared to an occupancy of a same location according to the occupancy map. For example, a stationary object should be expected to be present in both the current frame and the occupancy map.

In some demonstrative aspects, stationary objects may only generate zero-Doppler radar measurements. Accordingly, any non-zero Doppler radar measurement at a location of a stationary object may be identified as a FA, e.g., with a high probability.

In some demonstrative aspects, speed may be estimated, e.g., directly, from the LIDAR point cloud, e.g., for each LIDAR ray, for example, by employing a 3D sliding window cross-correlation between consecutive frames, or based on any other method.

In some demonstrative aspects, an expected Doppler, e.g., based on the estimated speed of a LIDAR-detected object, may be compared to a Doppler reported from the radar, for example, before allowing the radar detection to be associated with the LIDAR-detected object.

In some demonstrative aspects, radar detections, which are classified with a high probability, e.g., a probability of 100%, as either FAs or valid detections, may be labeled, while other radar detections may remain unlabeled.

In some demonstrative aspects, one or more operations may be performed, for example, for training processing scheme 1100 with respect to LIDAR scenarios including occlusion of targets, e.g., as described below.

In one example, LIDAR may be occluded by m objects, while a radar may be able to see passed them. For example, a radar can "see" multiple vehicles standing in a line while the LIDAR only "sees" the closest vehicle, e.g., similar to a camera.

In some demonstrative aspects, radar detections from objects that are occluded may have no LIDAR ray passing through them, or a LIDAR ray near them. Therefore, these radar detections may remain unlabeled.

In some demonstrative aspects, a NN, e.g., the NN of processing scheme 1100, may be able to extrapolate a good prediction for occluded objects.

In some demonstrative aspects, manual annotations and/or object-level tracking, e.g., including forward-backwards optimization, may be performed with respect to the LIDAR and/or cameras to assist in solving this problem of occlusions.

In some demonstrative aspects, another label, e.g., a third type of label, may be used to label a radar measurement that is determined to have been occluded in the LIDAR PC.

In some demonstrative aspects, the labeling process may include outlier filtering, e.g., as described below.

In some demonstrative aspects, driving during/after rain may be a typical case of outlier filtering with LIDAR. For example, wet surfaces may deflect the LIDAR rays in a way they may not be received by the LIDAR device. As a result the LIDAR-based system may "believe" that there is no object at such a location.

In opposed to the LIDAR system, radar may not be affected by light rain and, accordingly, filtering such cases from the dataset may not be an issue.

In some demonstrative aspects, a NN, e.g., the NN of processing scheme 1100, may be able to function properly in a scenario of light rain, for example, as the radar PC may be insensitive to changes caused by the light rain.

As one example of a performance of processing scheme 1100, detection results provided by processing scheme 1100 have been tested against ground-truth bounding boxes of vehicles and pedestrians, with a small, manually labeled dataset.

According to this example, processing scheme 1100 was tested in two scenarios including a highway drive, and an urban drive, with a total of 100 radar frames for each scenario.

According to this test, processing scheme 1100 wrongly filtered out as false alarms only two real objects during the two different scenarios that were tested, e.g., out of a total of more than 100 unique objects. These two objects included a distant pedestrian, and a vehicle entering a far side of a radar field of view. In both cases, processing scheme 1100 filtered out these objects during the first several frames, e.g., less than 0.5 seconds, but kept the objects during all following frames. In addition, both cases appeared during times in which the number of FA measurements around the object far exceeded the number of valid detections. These FAs were filtered-out by processing scheme 1100.

Figure 12A:
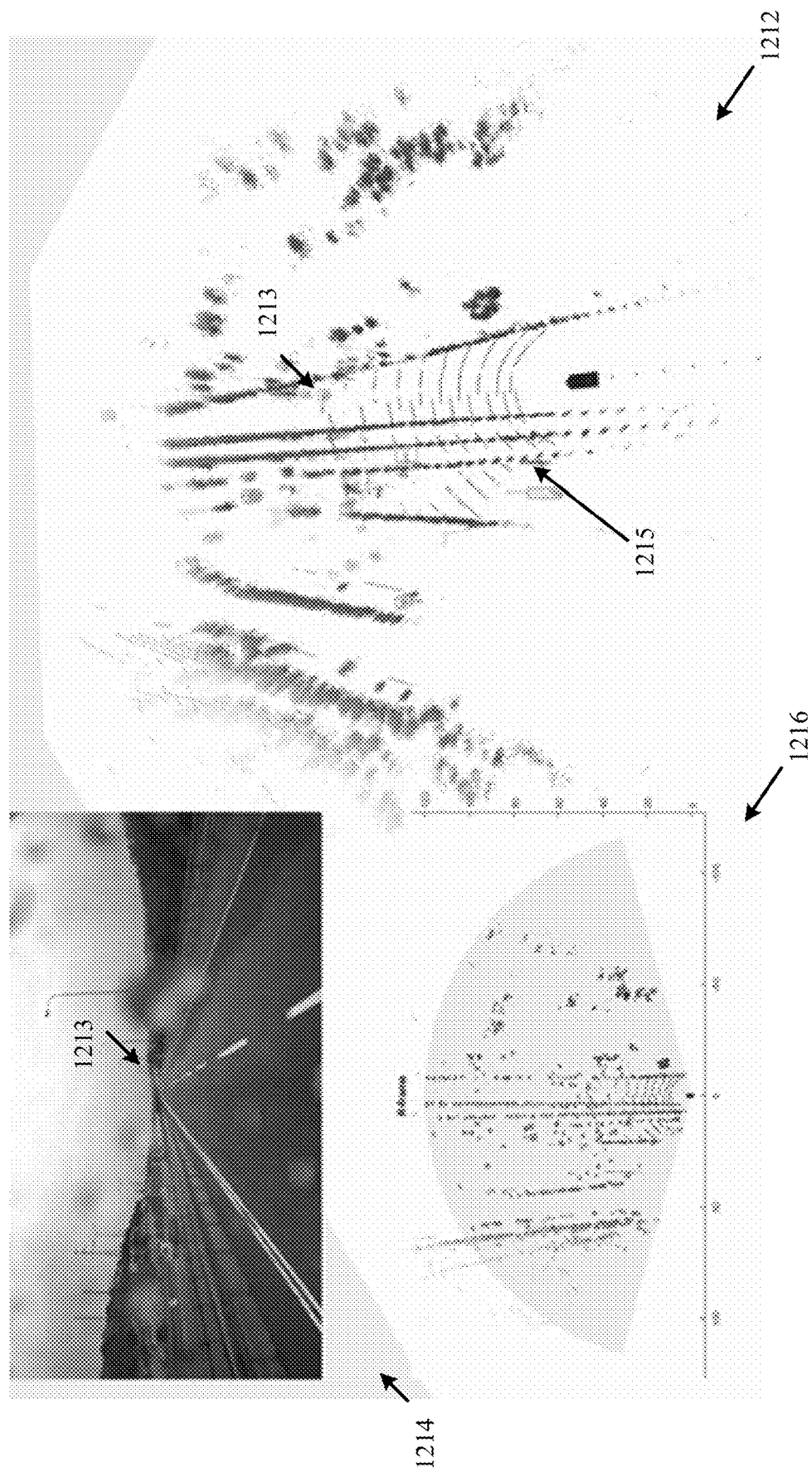
FIG. 12A is a schematic illustration of radar processing results corresponding to a driving scenario, to demonstrate a technical problem, which may be addressed, in accordance with some demonstrative aspects.

Reference is made to FIG. 12A, which schematically illustrates radar processing results 1212 of a driving scenario 1214, to demonstrate a technical problem, which may be addressed, in accordance with some demonstrative aspects.

In one example, radar processing results 1212 of the driving scenario 1214 may be based on raw radar detections 1216, for example, illustrated by a detection map, e.g., according to a radar coordinate frame.

In one example, radar processing results 1212 may be based on temporal filtering of PC radar information, e.g., raw radar detections 1216, with a total of 100 radar frames. For example, radar processing results 1212 may be an output of a temporal Probability Hypothesis Density filer (PHD) on the raw radar detections 1216.

In some demonstrative aspects, driving scenario 1214 may include a highway drive during rainy weather.

In one example, bounding boxes may be created according to a detection algorithm employed on an output of the temporal filter.

As shown in FIG. 12A, many FAs in the raw data detections 1216 may cause a radar system to imagine there are many ghost vehicles, e.g., including an object 1213 moving into a driving lane of the radar device.

As shown in FIG. 12A, the FAs may cause a radar system to imagine there is an extra guardrail 1215, which may cause the radar system to believe that real targets are in fact ghosts, for example, as they appear to be moving inside a stationary structure, e.g., guardrail 1215.

Figure 12B:
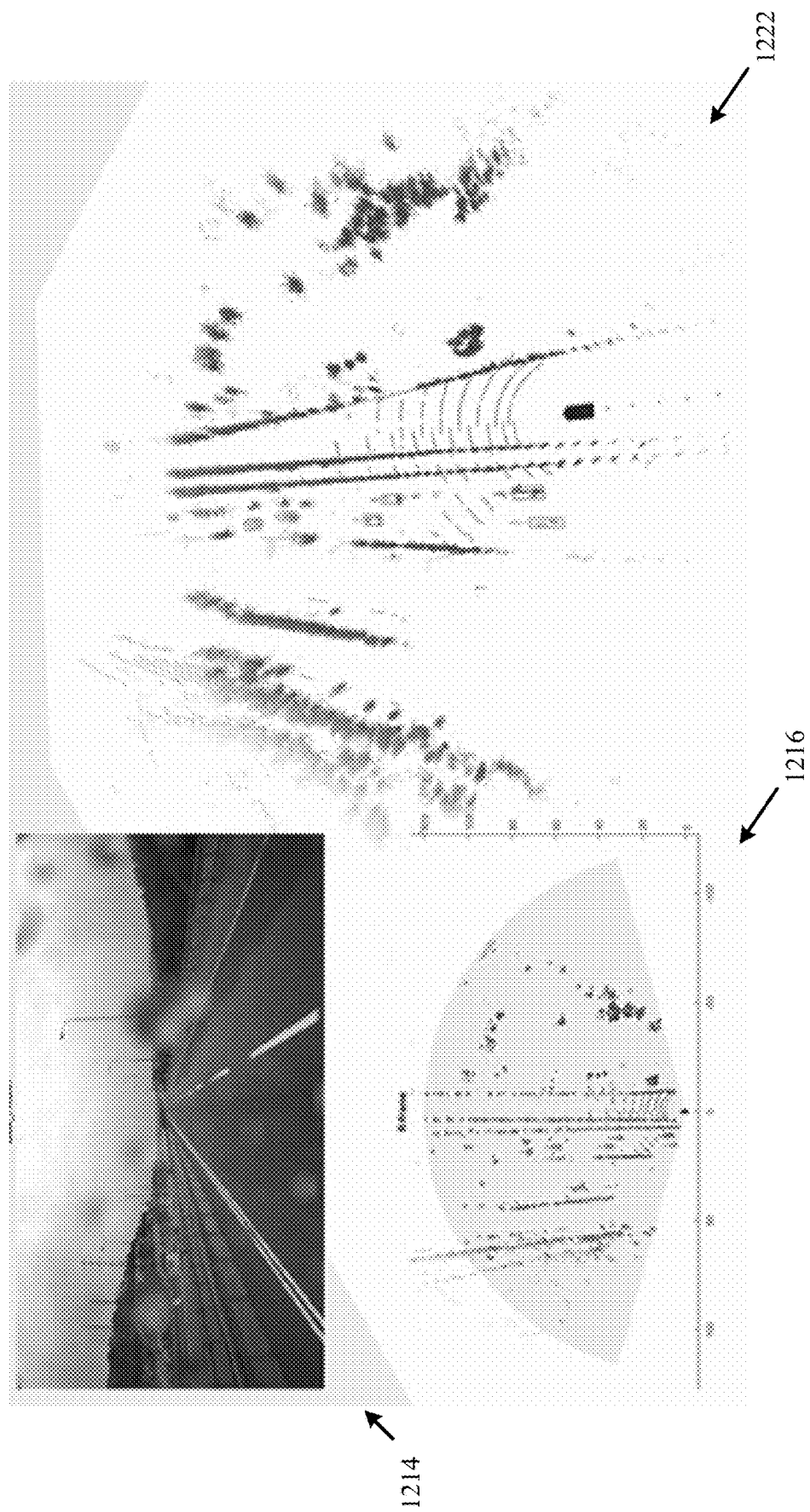
FIG. 12B is a schematic illustration of radar processing results corresponding to the driving scenario of FIG. 12A, in accordance with some demonstrative aspects.

Reference is made to FIG. 12B, which schematically illustrates radar processing results 1222 of the driving scenario 1214, in accordance with some demonstrative aspects.

In one example, radar processing results 1222 of the driving scenario 1214 may be based on the raw radar detections 1216.

In some demonstrative aspects, radar processing results 1212 may be generated, for example, by processing raw radar detections 1216 according to processing scheme 1100 (FIG. 11).

As shown in FIG. 12B, ghost vehicles, e.g., including object 1213 (FIG. 12A) and/or extra guardrail 1215 (FIG. 12A), may be filtered out by the processing scheme 1100 (FIG. 11).

Figure 13A:
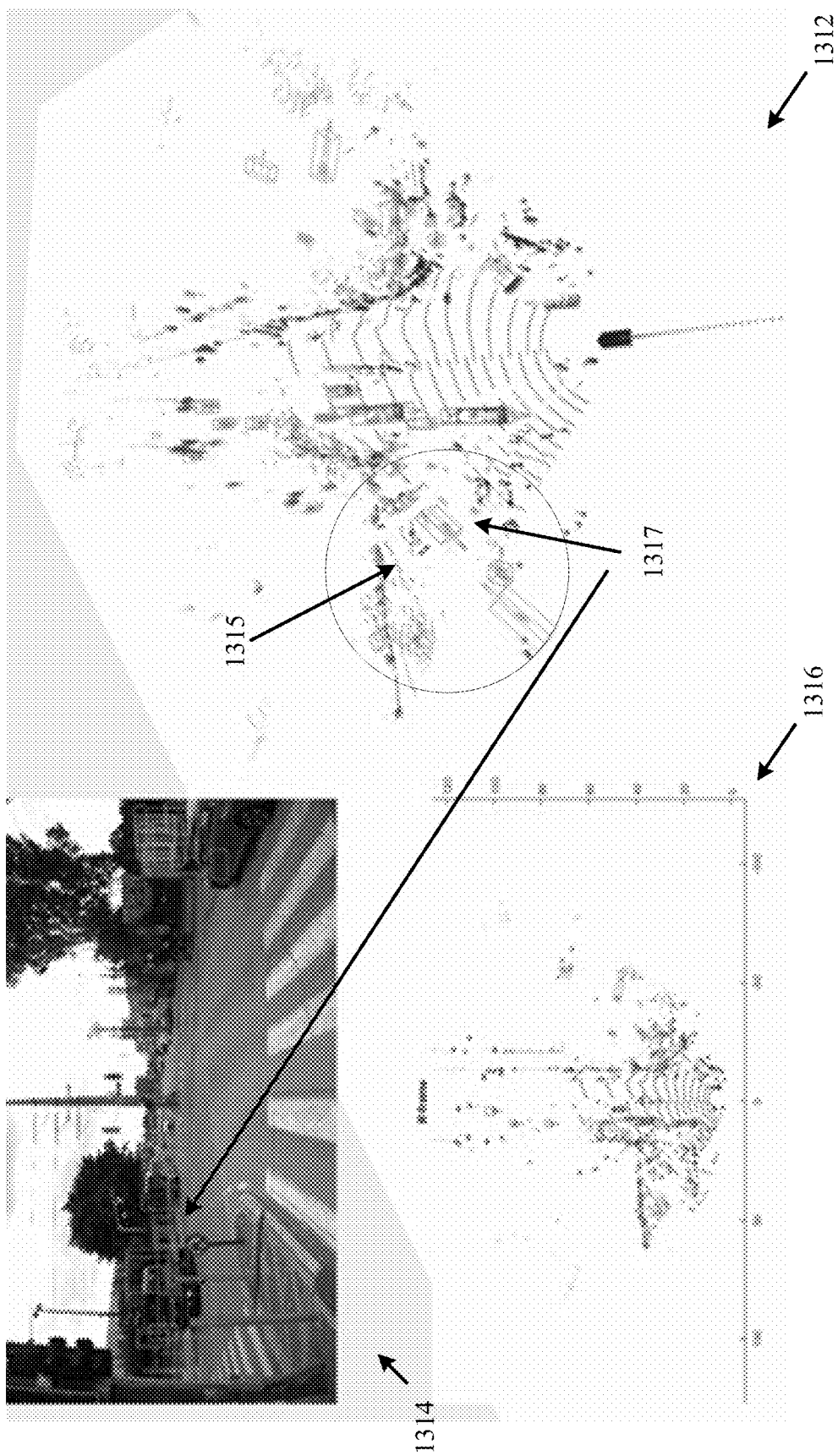
FIG. 13A is a schematic illustration of radar processing results corresponding to a driving scenario, to demonstrate a technical problem, which may be addressed, in accordance with some demonstrative aspects.

Reference is made to FIG. 13A, which schematically illustrates radar processing results 1312 of a driving scenario 1314, to demonstrate a technical problem, which may be addressed, in accordance with some demonstrative aspects.

In one example, radar processing results 1312 of the driving scenario 1314 may be based on raw radar detections 1316, for example, illustrated by a detection map, e.g., according to a radar coordinate frame.

In one example, radar processing results 1312 may be based on temporal filtering of PC radar information, e.g., raw radar detections 1316, with a total of 100 radar frames. For example, radar processing results 1312 may be an output of a temporal PHD on the raw radar detections 1316.

In some demonstrative aspects, driving scenario 1314 may include an urban scene, e.g., a very complex scene in an urban environment involving many vehicles and multipath.

In one example, bounding boxes may be created according to a detection algorithm employed on an output of the temporal filter.

As shown in FIG. 13A, many FAs in the input 1316 may cause a radar system to imagine there are many ghost vehicles 1315 demonstrated by a plurality of bounding boxes 1317.

Figure 13B:
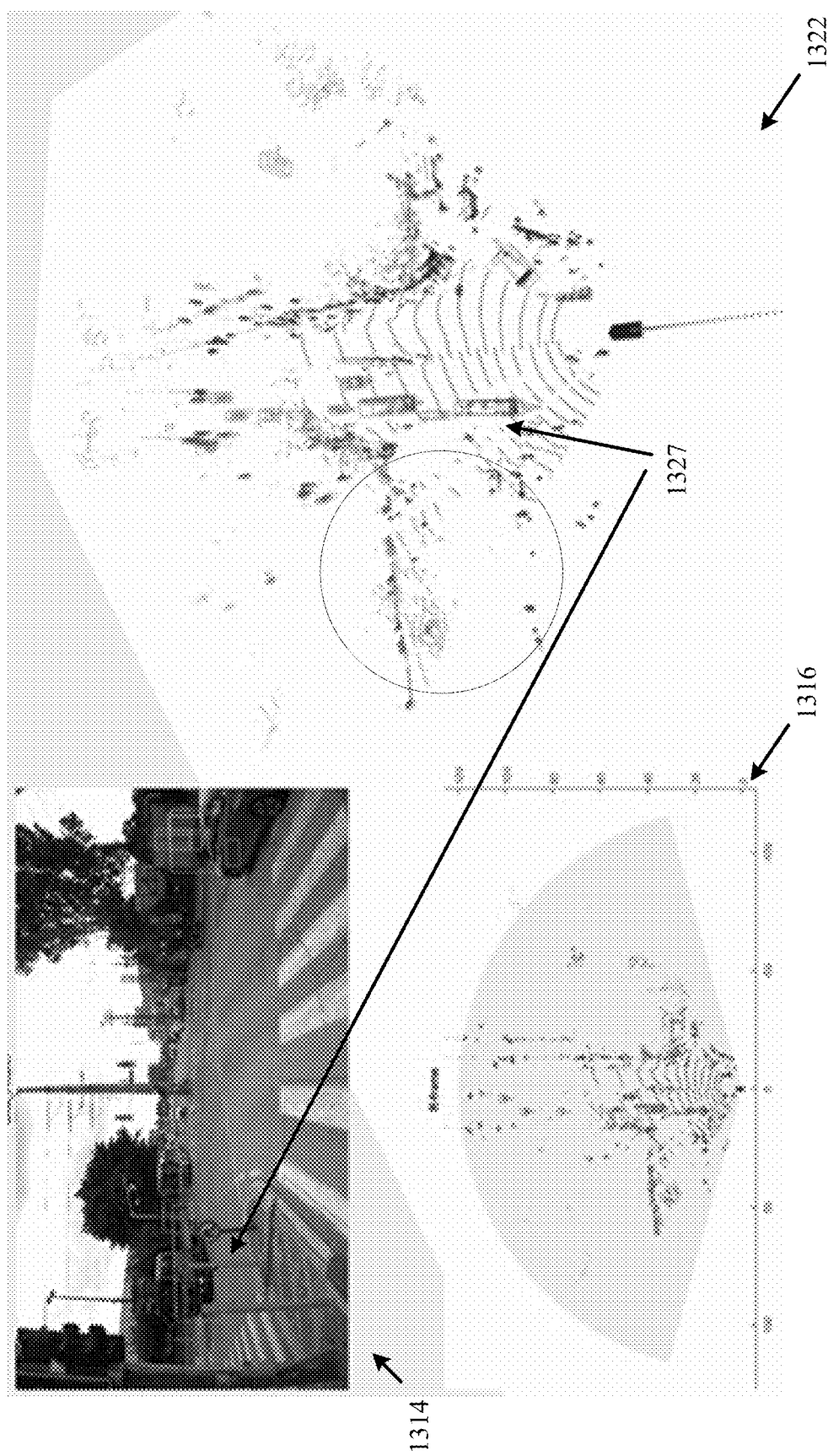
FIG. 13B is a schematic illustration of radar processing results corresponding to the driving scenario of FIG. 13A, in accordance with some demonstrative aspects.

Reference is made to FIG. 13B, which schematically illustrates radar processing results 1322 of the driving scenario 1314, in accordance with some demonstrative aspects.

In one example, radar processing results 1322 of the driving scenario 1314 may be based on the raw radar detections 1316.

In some demonstrative aspects, radar processing results 1322 may be generated, for example, by processing raw radar detections 1316 according to processing scheme 1100 (FIG. 11).

As shown in FIG. 13B, the ghost vehicles 1315 may be filtered out by processing scheme 1100 (FIG. 11), such that there may be bounding boxes 1327 only around true targets.

Figure 14:
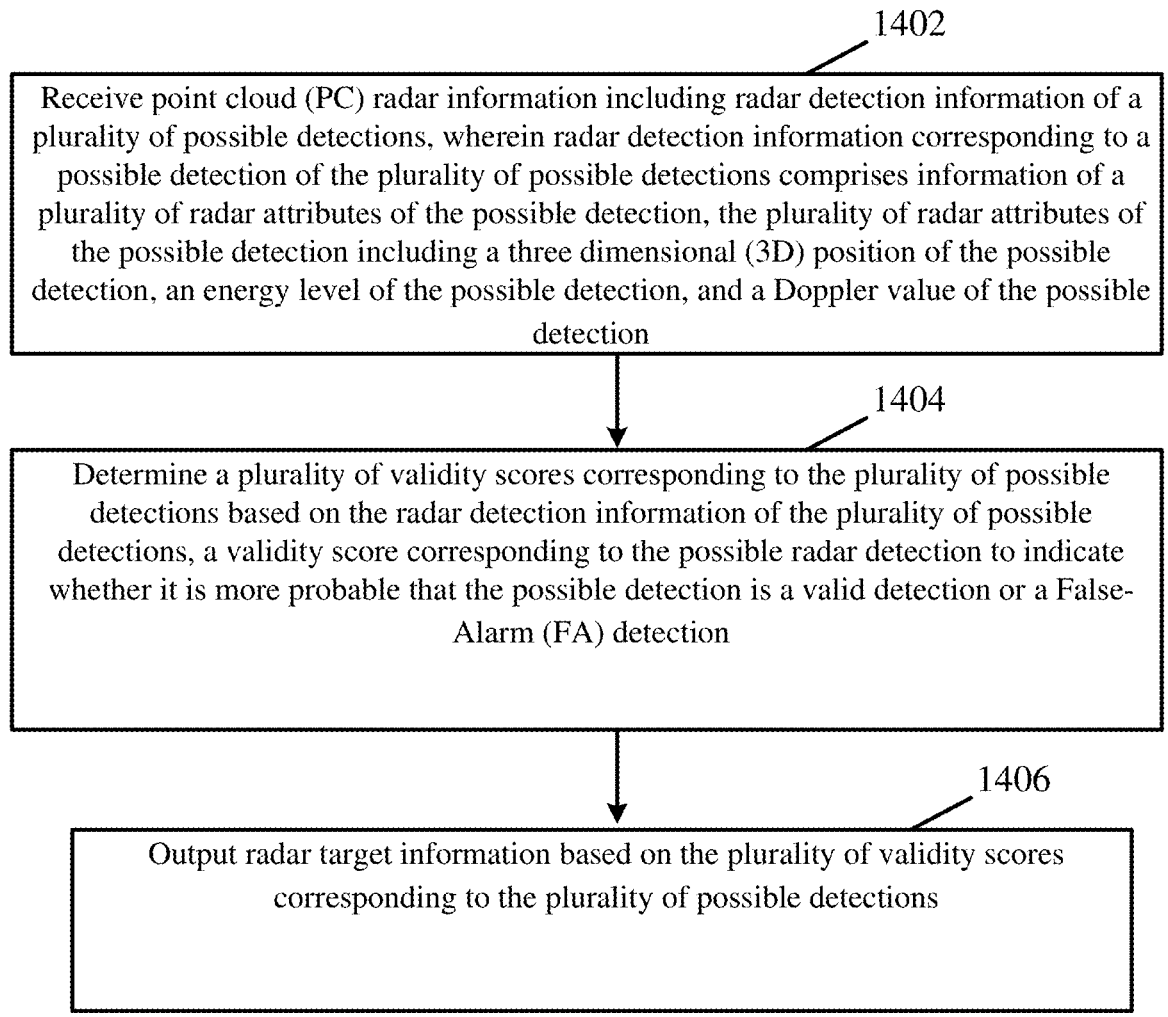
FIG. 14 is a schematic-flow chart illustration of a method of processing point cloud radar information, in accordance with some demonstrative aspects.

Reference is made to FIG. 14, which schematically illustrates a method of processing point cloud radar information, in accordance with some demonstrative aspects. For example, one or more of the operations of the method of FIG. 14 may be performed by a processor, e.g., processor 1034 (FIG. 10), radar processor 834 (FIG. 8), BB processor 930 (FIG. 9), and/or a controller, e.g., controller 950 (FIG. 9).

As indicated at block 1402, the method may include receiving PC radar information including radar detection information of a plurality of possible detections, wherein radar detection information corresponding to a possible detection of the plurality of possible detections includes information of a plurality of radar attributes of the possible detection, the plurality of radar attributes of the possible detection including a 3D position of the possible detection, an energy level of the possible detection, and a Doppler value of the possible detection. For example, processor 1034 (FIG. 10) may receive the PC radar information 1002 (FIG. 10) via input 1039 (FIG. 10), e.g., as described above.

As indicated at block 1404, the method may include determining a plurality of validity scores corresponding to the plurality of possible detections based on the radar detection information of the plurality of possible detections, a validity score corresponding to the possible radar detection to indicate whether it is more probable that the possible detection is a valid detection or a FA detection. For example, processor 1034 (FIG. 10) may determine the plurality of validity scores 1030 (FIG. 10) corresponding to the plurality of possible detections in PC radar information 1002, e.g., as described above.

As indicated at block 1406, the method may include outputting radar target information based on the plurality of validity scores corresponding to the plurality of possible detections. For example, processor 1034 (FIG. 10) may cause output 1037 (FIG. 10) to provide the radar target information 1047 (FIG. 10) based on the plurality of validity scores 1030 (FIG. 10) corresponding to the plurality of possible detections, e.g., as described above.

Figure 15:
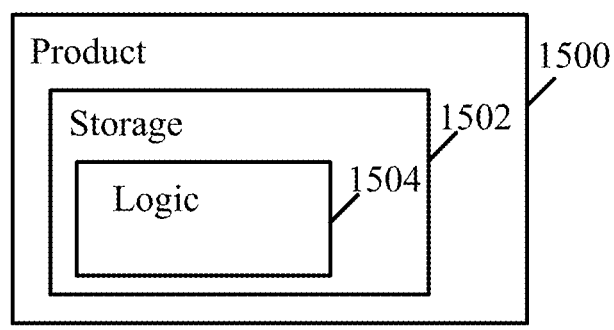
FIG. 15 is a schematic illustration of a product of manufacture, in accordance with some demonstrative aspects.

Reference is made to FIG. 15, which schematically illustrates a product of manufacture 1500, in accordance with some demonstrative aspects. Product 1500 may include one or more tangible computer-readable ("machine-readable") non-transitory storage media 1502, which may include computer-executable instructions, e.g., implemented by logic 1504. The computer-executable instructions, e.g., implemented by logic 1504, may be operable to, when executed by at least one computer processor, enable the at least one computer processor to implement one or more operations at a vehicle, e.g., vehicle 100 (FIG. 1), a radar device, e.g., radar device 101 (FIG. 1), radar device 800 (FIG. 8), and/or radar device 910 (FIG. 9), a processor, e.g., radar processor 834 (FIG. 8) processor 836 (FIG. 8), processor 930 (FIG. 9), and/or processor 1034 (FIG. 10), and/or a controller, e.g., controller 950 (FIG. 9); to cause a vehicle, e.g., vehicle 100 (FIG. 1), a radar device, e.g., radar device 101 (FIG. 1), radar device 800 (FIG. 8), and/or radar device 910 (FIG. 9), a processor, e.g., radar processor 834 (FIG. 8) processor 836 (FIG. 8), processor 930 (FIG. 9), and/or processor 1034 (FIG. 10), and/or a controller, e.g., controller 950 (FIG. 9), to perform, trigger and/or implement one or more operations and/or functionalities; and/or to perform, trigger and/or implement one or more operations and/or functionalities described with reference to one or more of the FIGS. 1-14, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1500 and/or storage media 1502 may include one or more types of computer-readable storage media capable of storing data, including volatile memory, non-volatile memory, removable or non-removable memory, erasable or non-erasable memory, writeable or re-writeable memory, and the like. For example, storage media 1502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1504 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising an input to receive point cloud (PC) radar information comprising radar detection information of a plurality of possible detections, wherein radar detection information corresponding to a possible detection of the plurality of possible detections comprises information of a plurality of radar attributes of the possible detection, the plurality of radar attributes of the possible detection comprising a three dimensional (3D) position of the possible detection, an energy level of the possible detection, and a Doppler value of the possible detection; a processor to determine a plurality of validity scores corresponding to the plurality of possible detections based on the radar detection information of the plurality of possible detections, wherein a validity score corresponding to the possible radar detection is to indicate whether it is more probable that the possible detection is a valid detection or a False-Alarm (FA) detection; and an output to output radar target information based on the plurality of validity scores corresponding to the plurality of possible detections.

Example 2 includes the subject matter of Example 1, and optionally, wherein the processor is configured to determine a Two Dimensional (2D) image comprising a plurality of pixels based on the PC radar information, and to determine the plurality of validity scores corresponding to the plurality of possible detections based on the 2D image, wherein a pixel of the plurality of pixels corresponding to the possible detection is based on the plurality of radar attributes of the possible detection.

Example 3 includes the subject matter of Example 2, and optionally, wherein the processor is configured to determine feature information of the plurality of possible detections based on the 2D image, and to determine the plurality of validity scores corresponding to the plurality of possible detections based on the feature information of the plurality of possible detections and the radar detection information of the plurality of possible detections, wherein feature information corresponding to the possible detection comprises one or more segmentation parameters corresponding to a segmentation of the pixel in the 2D image.

Example 4 includes the subject matter of Example 3, and optionally, wherein the processor is configured to determine augmented PC information corresponding to the plurality of possible detections based on the PC radar information and the feature information, and to determine the plurality of validity scores corresponding to the plurality of possible detections based on the augmented PC information, wherein the augmented PC information comprises a plurality of augmented sets of information corresponding to the plurality of possible detections, wherein a set of augmented information corresponding to the possible detection comprises the radar detection information corresponding to the possible detection, and the feature information corresponding to the possible detection.

Example 5 includes the subject matter of claim 4, and optionally, wherein the processor comprises a Neural Network (NN) trained to generate the plurality of validity scores corresponding to the plurality of possible detections based on an NN input comprising the augmented PC information.

Example 6 includes the subject matter of Example 5, and optionally, wherein the NN comprises a Pointnet.

Example 7 includes the subject matter of any one of Examples 4-6, and optionally, wherein the processor comprises a first Neural Network (NN) trained to generate the feature information of the plurality of possible detections based on the 2D image, and a second NN trained to generate the plurality of validity scores corresponding to the plurality of possible detections based on the plurality of augmented sets of information corresponding to the plurality of possible detections.

Example 8 includes the subject matter of any one of Examples 2-7, and optionally, wherein a pixel position of the pixel in the 2D image is based on the 3D position of the possible detection.

Example 9 includes the subject matter of any one of Examples 2-8, and optionally, wherein the processor is configured to determine one or more properties of the pixel corresponding to the possible detection based on at least one of the energy level of the possible detection, the Doppler value of the possible detection, or an elevation value of the 3D position of the possible detection.

Example 10 includes the subject matter of any one of Examples 2-9, and optionally, wherein the processor comprises a Neural Network (NN) trained to generate the feature information of the plurality of possible detections based on an NN input comprising the 2D image.

Example 11 includes the subject matter of Example 10, and optionally, wherein the NN comprises a convolutional neural network.

Example 12 includes the subject matter of Example 10 or 11, and optionally, wherein the NN comprises a U-NET.

Example 13 includes the subject matter of any one of Examples 1-12, and optionally, wherein the processor is configured to determine that the possible detection is a valid detection based on a determination that the validity score is above a predefined validity threshold.

Example 14 includes the subject matter of any one of Examples 1-14, and optionally, wherein the radar target information comprises a vector of the plurality of validity scores corresponding to the plurality of possible detections.

Example 15 includes the subject matter of any one of Examples 1-14, and optionally, wherein the radar target information comprises a list of valid detections comprising one or more possible detections of the plurality of possible detections, which are determined as valid based on the plurality of validity scores.

Example 16 includes the subject matter of any one of Examples 1-15, and optionally, comprising a radar device, the radar device comprising a transmitter to transmit (Tx) radar Tx signals, a receiver to receive (Rx) radar Rx signals based on the radar Tx signals, and a radar processor to generate the PC radar information based on the radar Rx signals.

Example 17 includes the subject matter of Example 16, and optionally, comprising a vehicle, the vehicle comprising a system controller to control one or more systems of the vehicle based on the radar target information.

Example 18 includes an apparatus comprising means for executing any of the described operations of one or more of Examples 1-17.

Example 19 includes a machine-readable medium that stores instructions for execution by a processor to perform any of the described operations of one or more of Examples 1-17.

Example 20 includes an apparatus comprising a memory; and processing circuitry configured to perform any of the described operations of one or more of Examples 1-17.

Example 21 includes a method including any of the described operations of one or more of Examples 1-17.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   an input to receive point cloud (PC) radar information comprising radar detection information of a plurality of possible detections, wherein radar detection information corresponding to a possible detection of the plurality of possible detections comprises information of a plurality of radar attributes of the possible detection, the plurality of radar attributes of the possible detection comprising a three dimensional (3D) position of the possible detection, an energy level of the possible detection, and a Doppler value of the possible detection;
   a processor to determine a plurality of validity scores corresponding to the plurality of possible detections based on the radar detection information of the plurality of possible detections, wherein a validity score corresponding to the possible detection is to indicate whether it is more probable that the possible detection is a valid detection or a False-Alarm (FA) detection, wherein the processor is configured to determine a Two Dimensional (2D) image comprising a plurality of pixels based on the PC radar information, and to determine the plurality of validity scores corresponding to the plurality of possible detections based on the 2D image, wherein a pixel of the plurality of pixels, which corresponds to the possible detection, is based on the plurality of radar attributes of the possible detection; and
   an output to output radar target information based on the plurality of validity scores corresponding to the plurality of possible detections.

2. The apparatus of claim 1, wherein the processor is configured to determine feature information of the plurality of possible detections based on the 2D image, and to determine the plurality of validity scores corresponding to the plurality of possible detections based on the feature information of the plurality of possible detections and the radar detection information of the plurality of possible detections, wherein feature information corresponding to the possible detection comprises one or more segmentation parameters corresponding to a segmentation of the pixel in the 2D image.

3. The apparatus of claim 2, wherein the processor is configured to determine augmented PC information corresponding to the plurality of possible detections based on the PC radar information and the feature information, and to determine the plurality of validity scores corresponding to the plurality of possible detections based on the augmented PC information, wherein the augmented PC information comprises a plurality of augmented sets of information corresponding to the plurality of possible detections, wherein an augmented set of information corresponding to the possible detection comprises the radar detection information corresponding to the possible detection, and the feature information corresponding to the possible detection.

4. The apparatus of claim 3, wherein the processor comprises a Neural Network (NN) trained to generate the plurality of validity scores corresponding to the plurality of possible detections based on an NN input comprising the augmented PC information.

5. The apparatus of claim 4, wherein the NN comprises a Pointnet.

6. The apparatus of claim 3, wherein the processor comprises a first Neural Network (NN) trained to generate the feature information of the plurality of possible detections based on the 2D image, and a second NN trained to generate the plurality of validity scores corresponding to the plurality of possible detections based on the plurality of augmented sets of information corresponding to the plurality of possible detections.

7. The apparatus of claim 1, wherein a pixel position of the pixel in the 2D image is based on the 3D position of the possible detection.

8. The apparatus of claim 1, wherein the processor is configured to determine one or more properties of the pixel corresponding to the possible detection based on at least one of the energy level of the possible detection, the Doppler value of the possible detection, or an elevation value of the 3D position of the possible detection.

9. The apparatus of claim 2, wherein the processor comprises a Neural Network (NN) trained to generate the feature information of the plurality of possible detections based on an NN input comprising the 2D image.

10. The apparatus of claim 9, wherein the NN comprises a convolutional neural network.

11. The apparatus of claim 9, wherein the NN comprises a U-NET.

12. The apparatus of claim 1, wherein the processor is configured to determine that the possible detection is the valid detection based on a determination that the validity score is above a predefined validity threshold.

13. The apparatus of claim 1, wherein the radar target information comprises a vector of the plurality of validity scores corresponding to the plurality of possible detections.

14. The apparatus of claim 1, wherein the radar target information comprises a list of valid detections comprising one or more possible detections of the plurality of possible detections, which are determined as valid based on the plurality of validity scores.

15. The apparatus of claim 1 comprising a radar device, the radar device comprising a transmitter to transmit (Tx) radar Tx signals, a receiver to receive (Rx) radar Rx signals based on the radar Tx signals, and a radar processor to generate the PC radar information based on the radar Rx signals.

16. A product comprising one or more tangible computer-readable non-transitory storage media comprising computer-executable instructions operable to, when executed by at least one processor, enable the at least one processor to:
process point cloud (PC) radar information comprising radar detection information of a plurality of possible detections, wherein radar detection information corresponding to a possible detection of the plurality of possible detections comprises information of a plurality of radar attributes of the possible detection, the plurality of radar attributes of the possible detection comprising a three dimensional (3D) position of the possible detection, an energy level of the possible detection, and a Doppler value of the possible detection;
determine a plurality of validity scores corresponding to the plurality of possible detections based on the radar detection information of the plurality of possible detections, wherein a validity score corresponding to the possible detection is to indicate whether it is more probable that the possible detection is a valid detection or a False-Alarm (FA) detection, wherein the instructions, when executed, cause the processor to determine a Two Dimensional (2D) image comprising a plurality of pixels based on the PC radar information, and to determine the plurality of validity scores corresponding to the plurality of possible detections based on the 2D image, wherein a pixel of the plurality of pixels, which corresponds to the possible detection, is based on the plurality of radar attributes of the possible detection; and
output radar target information based on the plurality of validity scores corresponding to the plurality of possible detections.

17. The product of claim 16, wherein the instructions, when executed, cause the processor to determine one or more properties of the pixel corresponding to the possible detection based on at least one of the energy level of the possible detection, the Doppler value of the possible detection, or an elevation value of the 3D position of the possible detection.

18. The product of claim 16, wherein the instructions, when executed, cause the processor to determine feature information of the plurality of possible detections based on the 2D image, and to determine the plurality of validity scores corresponding to the plurality of possible detections based on the feature information of the plurality of possible detections and the radar detection information of the plurality of possible detections, wherein feature information corresponding to the possible detection comprises one or more segmentation parameters corresponding to a segmentation of the pixel in the 2D image.

19. The product of claim 18, wherein the instructions, when executed, cause the processor to determine augmented PC information corresponding to the plurality of possible detections based on the PC radar information and the feature information, and to determine the plurality of validity scores corresponding to the plurality of possible detections based on the augmented PC information, wherein the augmented PC information comprises a plurality of augmented sets of information corresponding to the plurality of possible detections, wherein an augmented set of information corresponding to the possible detection comprises the radar detection information corresponding to the possible detection, and the feature information corresponding to the possible detection.

20. The product of claim 16, wherein the instructions, when executed, cause the processor to determine that the possible detection is the valid detection based on a determination that the validity score is above a predefined validity threshold.

21. The product of claim 16, wherein the radar target information comprises a vector of the plurality of validity scores corresponding to the plurality of possible detections.

22. The product of claim 16, wherein the radar target information comprises a list of valid detections comprising one or more possible detections of the plurality of possible detections, which are determined as valid based on the plurality of validity scores.

23. A vehicle comprising:
a system controller configured to control one or more vehicular systems of the vehicle based on radar information; and
a radar device configured to provide the radar information to the system controller, the radar device comprising:
a plurality of Transmit (Tx) antennas to transmit radar Tx signals, and a plurality of Receive (Rx) antennas to receive radar Rx signals based on the radar Tx signals; and a processor configured to:
  process point cloud (PC) radar information comprising radar detection information of a plurality of possible detections, the PC radar information based on the radar Rx signals, wherein radar detection information corresponding to a possible detection of the plurality of possible detections comprises information of a plurality of radar attributes of the possible detection, the plurality of radar attributes of the possible detection comprising a three dimensional (3D) position of the possible detection, an energy level of the possible detection, and a Doppler value of the possible detection; and
  determine a plurality of validity scores corresponding to the plurality of possible detections based on the radar detection information of the plurality of possible detections, wherein a validity score corresponding to the possible detection is to indicate whether it is more probable that the possible detection is a valid detection or a False-Alarm (FA) detection, wherein the radar information is based on the plurality of validity scores corresponding to the plurality of possible detections,
  wherein the processor is configured to determine a Two Dimensional (2D) image comprising a plurality of pixels based on the PC radar information, and to determine the plurality of validity scores corresponding to the plurality of possible detections based on the 2D image, wherein a pixel of the plurality of pixels, which corresponds to the possible detection, is based on the plurality of radar attributes of the possible detection.

24. The vehicle of claim 23, wherein the processor is configured to determine feature information of the plurality of possible detections based on the 2D image, and to determine the plurality of validity scores corresponding to the plurality of possible detections based on the feature information of the plurality of possible detections and the radar detection information of the plurality of possible detections, wherein feature information corresponding to the possible detection comprises one or more segmentation parameters corresponding to a segmentation of the pixel in the 2D image.

\* \* \* \* \*